United States Patent
Laidlow et al.

(10) Patent No.: US 11,941,831 B2
(45) Date of Patent: Mar. 26, 2024

(54) DEPTH ESTIMATION

(71) Applicant: Imperial College Innovations Limited, London (GB)

(72) Inventors: Tristan William Laidlow, London (GB); Jan Czarnowski, Gdanski (PL); Stefan Leutenegger, Munich (DE)

(73) Assignee: Imperial College Innovations Limited, London (GB)

( * ) Notice: Subject to any disclaimer, the term of this patent is extended or adjusted under 35 U.S.C. 154(b) by 245 days.

(21) Appl. No.: 17/384,359

(22) Filed: Jul. 23, 2021

(65) Prior Publication Data

US 2021/0350560 A1    Nov. 11, 2021

Related U.S. Application Data

(63) Continuation of application No. PCT/GB2020/050084, filed on Jan. 15, 2020.

(30) Foreign Application Priority Data

Jan. 24, 2019    (GB) ........................... 1901007

(51) Int. Cl.
*G06T 7/55*    (2017.01)
*G05D 1/00*    (2006.01)
(Continued)

(52) U.S. Cl.
CPC .............. *G06T 7/55* (2017.01); *G05D 1/0251* (2013.01); *G06N 3/04* (2013.01); *G06T 1/0014* (2013.01);
(Continued)

(58) Field of Classification Search
CPC ........... G06T 7/55; G06T 1/0014; G06T 7/70; G06T 2207/10016; G06T 2207/20076;
(Continued)

(56) References Cited

U.S. PATENT DOCUMENTS 9,111,350 B1 *   8/2015   Mukherjee .............. G06T 15/00
10,455,212 B1 *  10/2019  Konolige .............. H04N 13/282
(Continued)

FOREIGN PATENT DOCUMENTS

CN    103413347 B    7/2016
CN    108416840 A    8/2018

OTHER PUBLICATIONS

Chamara et al, "Just-in-Time Reconstruction: inpainting Sparse Maps using Single View Depth Predictors as Priors", 201 online library Cornell university Itchaca, NY 14853, May 11, 2018) (Year: 2018).*

(Continued)

*Primary Examiner* — Amara Abdi
(74) *Attorney, Agent, or Firm* — EIP US LLP

(57) ABSTRACT

An image processing system to estimate depth for a scene. The image processing system includes a fusion engine to receive a first depth estimate from a geometric reconstruction engine and a second depth estimate from a neural network architecture. The fusion engine is configured to probabilistically fuse the first depth estimate and the second depth estimate to output a fused depth estimate for the scene. The fusion engine is configured to receive a measurement of uncertainty for the first depth estimate from the geometric reconstruction engine and a measurement of uncertainty for the second depth estimate from the neural network architecture, and use the measurements of uncertainty to probabilistically fuse the first depth estimate and the second depth estimate.

32 Claims, 13 Drawing Sheets

(51) Int. Cl.
- G06N 3/04 (2023.01)
- G06T 1/00 (2006.01)
- G06T 7/70 (2017.01)

(52) U.S. Cl.
CPC ...... *G06T 7/70* (2017.01); *G06T 2207/10016* (2013.01); *G06T 2207/20076* (2013.01); *G06T 2207/20084* (2013.01); *G06T 2207/20221* (2013.01); *G06T 2207/30244* (2013.01)

(58) Field of Classification Search
CPC . G06T 2207/20084; G06T 2207/20221; G06T 2207/30244; G06T 5/50; G06T 2207/10028; G05D 1/0251; G06N 3/04
See application file for complete search history.

(56) References Cited

U.S. PATENT DOCUMENTS

| | | | | |
|---|---|---|---|---|
| 2010/0309201 | A1* | 12/2010 | Lim | G06T 5/50 345/419 |
| 2014/0334670 | A1* | 11/2014 | Guigues | G06V 40/23 382/103 |
| 2021/0341928 | A1* | 11/2021 | Sampaio Martins Pereira | G05D 1/0214 |

OTHER PUBLICATIONS

Keisuke et al, ("CNN-SLAM: Real-time dense monocular SLAM with learned depth prediction", IEEE, Apr. 11, 2017) (Year: 2017).*

United Kingdom Search report dated Jul. 19, 2019 for United Kingdom Application No. GB1901007.3.

United Kingdom Examination report dated Nov. 11, 2020 or United Kingdom Application No. GB1901007.3.

International Search Report and Written Opinion dated Apr. 6, 2020 for PCT International Application No. PCT/GB2020/050084.

Tateno et al., "CNN-SLAM: Real-time dense monocular SLAM with learned depth prediction" 2017 IEEE Conference on Computer Vision and Pattern Recognition, Apr. 11, 2017, IEEE, pp. 6565-6574.

Zhang et al. "Deep Depth Completion of a Single RGB-D Image", May 2, 2018, https://arxiv.Org/abs/1803.09326.

Weerasekera et al., "Dense Monocular Reconstruction using Surface Normals" 2017 IEEE International Conference on Robotics and Automation (ICRA), May 29, 2017, IEEE, pp. 2524-2531.

Laidlow et al.,: "DeepFusion: Real-Time Dense 3D Reconstruction for Monocular SLAM using Single-View Depth and Gradient Predictions", 2019 International Conference on Robotics and Automation (ICRA), IEEE, May 20, 2019 (May 20, 2019), pp. 4068-4074, XP033593489.

Engel et al.,: "Semi-Dense Visual Odometry for a Monocular Camera", Computer Vision (ICCV), 2011 IEEE International Conference on, IEEE, Dec. 1, 2013 (Dec. 1, 2013), pp. 1449-1456, XP032572973.

Liu et al.,: "Neural RGB—D Sensing: Depth and Uncertainty from a Video Camera", Arxiv.org, Cornell University Library, 201 Olin Library Cornell University Ithaca, NY 14853, Jan. 9, 2019 (Jan. 9, 2019), XP081012769.

Weerasekera et al., "Just-in-Time Reconstruction: Inpainting Sparse Maps using Single View Depth Predictors as Priors" May 11, 2018 IEEE International Conference on Robotics and Automation (ICRA), published 2018, IEEE, pp. 4977-4984.

* cited by examiner

DEPTH ESTIMATION

CROSS-REFERENCE TO RELATED APPLICATIONS

This application is a continuation of International Application No. PCT/GB2020/050084, filed Jan. 15, 2020 which claims priority to UK Application No. GB1901007.3, filed Jan. 24, 2019, under 35 U.S.C. § 119(a). Each of the above referenced patent applications is incorporated by reference in its entirety.

BACKGROUND

Field of the Invention

The present invention relates to estimating depth for a scene. The invention has particular, but not exclusive, relevance to depth estimation for use by a robotic device to navigate and/or interact with its environment.

Description of the Related Technology

In the field of computer vision and robotics, there is often a need to construct a representation of a three-dimensional (3D) space. Constructing a representation of a 3D space allows a real-world environment to be mapped to a virtual or digital realm, where it may be used and manipulated by electronic devices. For example, in augmented reality applications, a user may use a handheld device to interact with virtual objects that correspond to entities in a surrounding environment, or a moveable robotic device may require a representation of a 3D space to allow simultaneous localisation and mapping, and thus navigation of its environment. In many applications there may be a need for intelligent systems to have a representation of an environment, so as to couple digital information sources to physical objects. This then allows advanced human-machine interfaces, where the physical environment surrounding a person becomes the interface. In a similar manner, such representations may also enable advanced machine-world interfaces, e.g. enabling robotic devices to interact with and manipulate physical objects in a real-world environment.

There are several techniques available for constructing a representation of a 3D space. For example, structure from motion and simultaneous localisation and mapping (SLAM) are two such techniques. SLAM techniques typically involve the estimation of a depth of a 3D scene to be mapped. Depth estimation may be performed using a depth camera. However, depth cameras typically have limited range, relatively high power consumption and may not function correctly in outdoor environments, such as in bright sunlight. In other cases, depth estimation may be performed without the use of a depth camera, for example based on images of the space.

The paper "CNN-SLAM: Real-time dense monocular SLAM with learned depth prediction" by K. Tateno et al, as set out in the Proceedings of the IEEE Conference on Computer Vision and Pattern Recognition (CVPR), 2017, describes fusion of a depth map obtained by a convolutional neural network (CNN) with depth measurements obtained from direct monocular SLAM. To recover blurred depth borders, the CNN-predicted depth map is used as an initial guess for reconstruction and is successively refined by means of a direct SLAM scheme relying on small-baseline stereo matching on a per-pixel basis. However, this approach does not preserve global consistency.

Given existing techniques, there is a desire for useable and efficient methods of depth estimation, for example to improve the mapping of a 3D space.

SUMMARY

According to a first aspect of the present invention, there is provided an image processing system to estimate depth for a scene. The image processing system comprises a fusion engine to receive a first depth estimate from a geometric reconstruction engine and a second depth estimate from a neural network architecture, and to probabilistically fuse the first depth estimate and the second depth estimate to output a fused depth estimate for the scene, wherein the fusion engine is configured to receive a measurement of uncertainty for the first depth estimate from the geometric reconstruction engine and a measurement of uncertainty for the second depth estimate from the neural network architecture, and wherein the fusion engine is configured to use the measurements of uncertainty to probabilistically fuse the first depth estimate and the second depth estimate.

In certain examples, the fusion engine is configured to receive a surface orientation estimate, and a measure of uncertainty for the surface orientation estimate, from the neural network architecture, and to use the surface orientation estimate, and the measure of uncertainty for the surface orientation estimate, to probabilistically fuse the first depth estimate and the second estimate.

In certain examples, the surface orientation estimate comprises one or more of: a depth gradient estimate in a first direction; a depth gradient estimate in a direction orthogonal to the first direction; and a surface normal estimate.

In certain examples, the fusion engine is configured to determine a scale estimate when probabilistically fusing the first depth estimate and the second estimate.

In certain examples, the scene is captured in a first frame of video data, the second depth estimate is received for the first frame of video data, the first depth estimate comprises a plurality of first depth estimates for the first frame of video data, at least one of the plurality of first depth estimates being generated using a second frame of video data that differs from the first frame of video data, and the fusion engine is configured to iteratively output the fused depth estimate for the scene, at each iteration processing the second depth estimate and one of the plurality of depth estimates.

In certain examples, the first depth estimate, the second depth estimate and the fused depth estimate each comprise a depth map for a plurality of pixels.

In certain examples, the first depth estimate is a semi-dense depth estimate, and the second depth estimate and the fused depth estimate each comprise a dense depth estimate.

In certain examples, the system comprises: a monocular camera to capture frames of video data; a tracking system to determine poses of the monocular camera during observation of the scene; and the geometric reconstruction engine. In such examples, the geometric reconstruction engine is configured to use the poses from the tracking system and the frames of video data to generate depth estimates for at least a subset of pixels from the frames of video data, the geometric reconstruction engine being configured to minimise a photometric error to generate the depth estimates.

In certain examples, the system comprises the neural network architecture, and the neural network architecture comprises one or more neural networks and is configured to receive pixel values for frames of video data and predict: a depth estimate for each of a first set of image portions to generate the second depth estimate; at least one surface orientation estimate for each of a second set of image portions; one or more uncertainty measures associated with each depth estimate; and one or more uncertainty measures associated with each surface orientation estimate.

According to a second aspect of the present invention there is provided a method of estimating depth for a scene. The method comprises generating a first depth estimate for the scene using a geometric reconstruction of the scene, wherein the geometric reconstruction is configured to output a measure of uncertainty for the first depth estimate; generating a second depth estimate for the scene using a neural network architecture, wherein the neural network architecture is configured to output a measure of uncertainty for the second depth estimate; and probabilistically fusing the first depth estimate and the second depth estimate using the measures of uncertainty to generate a fused depth estimate for the scene.

In certain examples, the method comprises, prior to generating the first depth estimate, obtaining image data representative of two or more views of the scene from a camera. In such examples, generating the first depth estimate comprises: obtaining a pose estimate for the camera; and generating the first depth estimate by minimising a photometric error, the photometric error being a function of at least the pose estimate and the image data.

In certain examples, the method comprises, prior to generating the first depth estimate, obtaining image data representative of one or more views of the scene from a camera. In such examples, generating the second depth estimate comprises: receiving, at the neural network architecture, the image data; predicting, using the neural network architecture, a depth estimate for each of a set of image portions to generate the second depth estimate; predicting, using the neural network architecture, at least one surface orientation estimate for each of the set of image portions; and predicting, using the neural network architecture, a set of uncertainty measures for each depth estimate and for each surface orientation estimate. The surface orientation estimate may comprise one or more of: a depth gradient estimate in a first direction; a depth gradient estimate in a direction orthogonal to the first direction; and a surface normal estimate.

In certain examples, the method comprises, prior to generating the first depth estimate, obtaining image data representative of two or more views of the scene from a camera, the image data comprising a plurality of pixels. In such examples, generating the first depth estimate comprises: obtaining a pose estimate for the camera; and generating a semi-dense depth estimate, the semi-dense depth estimate comprising depth estimates for a portion of the pixels in the image data. In these examples, generating the second depth estimate comprises generating a dense depth estimate for the pixels in the image data, and probabilistically fusing the first depth estimate and the second depth estimate comprises outputting a dense depth estimate for the pixels in the image data.

In certain examples, the method is iteratively repeated and, for a subsequent iteration, the method comprises determining whether to generate the second depth estimate, and probabilistically fusing the first depth estimate and the second depth estimate comprises, responsive to a determination not to generate the second depth estimate, using a previous set of values for the second depth estimate.

In certain examples, the method is applied to frames of video data and probabilistically fusing the first depth estimate and the second depth estimate comprises, for a given frame of video data: optimising a cost function comprising a first cost term associated with the first depth estimate and a second cost term associated with the second depth estimate. In such examples, the first cost term comprises a function of fused depth estimate values, first depth estimate values and uncertainty values for the first depth estimate, the second cost term comprises a function of fused depth estimate values, second depth estimate values, and uncertainty values for the second depth estimate, and the cost function is optimised to determine the fused depth estimate values. Optimising the cost function may comprise determining a scale factor for the fused depth estimate, the scale factor indicating a scale for the fused depth estimate with respect to the scene. In some examples, the method includes generating at least one surface orientation estimate for the scene using the neural network architecture, wherein the neural network architecture is configured to output a measure of uncertainty for each of the at least one surface orientation estimate, wherein the cost function comprises a third cost term associated with the at least one surface orientation estimate, wherein the third cost term comprises a function of fused depth estimate values, surface orientation estimate values, and uncertainty values for each of the at least one surface orientation estimate.

In a particular set of examples according to the second aspect, the geometric reconstruction of the scene is configured to generate a first depth probability volume for the scene, the first depth probability volume comprising: a first plurality of depth estimates, comprising the first depth estimate; and a first plurality of measures of uncertainty, each associated with a respective depth estimate of the first plurality of depth estimates, wherein a measure of uncertainty associated with a given depth estimate of the first plurality of depth estimates represents a probability that a given region of the scene is at a depth represented by the given depth estimate of the first plurality of depth estimates; and the neural network architecture is configured to output a second depth probability volume for the scene, the second depth probability volume comprising: a second plurality of depth estimates, comprising the second depth estimate; and a second plurality of measures of uncertainty, each associated with a respective depth estimate of the second plurality of depth estimates, wherein a measure of uncertainty associated with a given depth estimate of the second plurality of depth estimates represents a probability that a given region of the scene is at a depth represented by the given depth estimate of the second plurality of depth estimates.

In certain examples of the particular set of examples, generating the second depth estimate for the scene comprises processing image data representative of an image of the scene using the neural network architecture to generate the second depth probability volume, wherein the second plurality of depth estimates comprises a plurality of sets of depth estimates, each associated with a different respective portion of the image of the scene.

In certain examples of the particular set of examples, the second plurality of depth estimates comprises depth estimates having predefined values. The predefined values may have a non-uniform spacing therebetween. The predefined values may comprise a plurality of log-depth values within a predefined depth range.

In certain examples of the particular set of examples, generating the first depth probability volume for the scene comprises: processing a first frame of video data representing a first observation of the scene and a second frame of video data representing a second observation of the scene to generate, for each of a plurality of portions of the first frame, a set of photometric errors, each associated with a different respective depth estimate of the first plurality of depth estimates; and scaling the photometric errors to convert the photometric errors to respective probability values.

In certain examples of the particular set of examples, probabilistically fusing the first depth estimate and the second depth estimate using the measures of uncertainty comprises combining the first plurality of measures of uncertainty with the second plurality of measures of uncertainty to generate a fused probability volume. In these examples, generating the fused depth estimate for the scene may comprise obtaining the fused depth estimate for the scene from the fused probability volume. These examples may comprise obtaining a depth probability function using the fused probability volume; and using the depth probability function to obtain the fused depth estimate. In these examples, obtaining the fused depth estimate may comprise optimising a cost function comprising: a first cost term obtained using the fused probability volume; and a second cost term comprising a local geometric constraint on depth values. In such cases, the method may further comprise receiving a surface orientation estimate and an occlusion boundary estimate from a further neural network architecture; and generating the second cost term using the surface orientation estimate and the occlusion boundary estimate. In these examples, the fused depth probability volume may be a first fused depth probability volume associated with a first frame of video data representing a first observation of the scene, and the method may comprise: converting the first fused depth probability volume to a first occupancy probability volume; warping the first occupancy probability volume based on pose data representing poses of a camera during observation of the scene to obtain a second occupancy probability volume associated with a second frame of video data representing a second observation of the scene; and converting the second occupancy probability volume to a second fused depth probability volume associated with the second frame.

According to a third aspect of the invention, there is provided an image processing system to estimate depth for a scene, comprising: a fusion engine to receive a first depth probability volume from a geometric reconstruction engine and a second depth probability volume from a neural network architecture, and to fuse the first depth probability volume and the second depth probability volume to output a fused depth probability volume for the scene; and a depth estimation engine to use the fused depth probability volume to estimate the depth for the scene.

According to a fourth aspect of the invention, there is provided a method of estimating depth for a scene, comprising: generating a first depth probability volume for the scene using a geometric reconstruction of the scene; generating a second depth probability volume for the scene using a neural network architecture; fusing the first depth probability volume and the second depth probability volume to generate a fused depth probability volume for the scene; and generating a fused depth estimate for the scene using the fused depth probability volume.

According to a fifth aspect of the invention, there is provided a computing system comprising: a monocular capture device to provide frames of video; a simultaneous localisation and mapping system to provide pose data for the monocular capture device; the system of the first or third aspects; a semi-dense multi-view stereo component to receive the pose data and the frames of video and to implement the geometric reconstruction engine; and electronic circuitry to implement the neural network architecture.

According to a sixth aspect of the invention, there is provided a robotic device comprising: the computing system of the fifth aspect; one or more actuators to enable the robotic device to interact with a surrounding three-dimensional environment, wherein at least a portion of the surrounding three-dimensional environment is shown in the scene; and an interaction engine comprising at least one processor to control the one or more actuators, wherein the interaction engine is to use the fused depth estimate to interact with the surrounding three-dimensional environment.

According to a seventh aspect of the invention, there is provided a non-transitory computer-readable storage medium comprising computer-executable instructions which, when executed by a processor, cause a computing device to perform any of the methods described above.

Further features will become apparent from the following description of embodiments of the invention, given by way of example only, which is made with reference to the accompanying drawings.

DETAILED DESCRIPTION

Figure 1A:
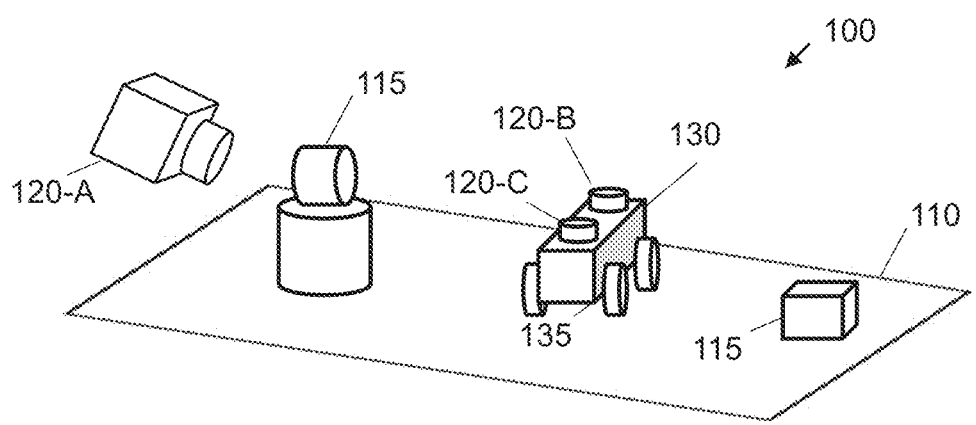
FIG. 1A is a schematic diagram showing an example of a three-dimensional (3D) space.

Certain examples described herein enable depth for a scene to be estimated. Such examples include generation of a first depth estimate for the scene using a geometric reconstruction of the scene. The first depth estimate may be generated, for example, by processing images of the scene. An image may for example be a two-dimensional (2D) colour image, which may be e.g. an RGB (red, green, blue) image. The first depth estimate may be generated based on geometric constraints. For example, it may be assumed that the colour of a pixel in an image representing a given portion of a scene is independent of a position of a camera used to capture the image. This may be exploited in the generation of the first depth estimate, as explained further with reference to the Figures. The geometric reconstruction is also configured to output a measure of uncertainty for the first depth estimate, which for example indicates how precise the first depth estimate is. For example, where the first depth estimate is well-constrained and can be estimated accurately, the measure of uncertainty may be lower than in other cases in which the first depth estimate is less well-constrained.

A second depth estimate for the scene is generated using a neural network architecture. The neural network architecture is also configured to output a measure of uncertainty for the second depth estimate. For example, an image of the scene may be processed using a neural network architecture such as a convolutional neural network (CNN), which has been trained to predict both depth estimates and associated uncertainties from input images. The measures of uncertainty may indicate the confidence in the associated second depth estimate. For example, a second depth estimate for regions of an image including an object which was absent from training data used to train the neural network architecture may be relatively uncertain, and may therefore be associated with a relatively high measure of uncertainty as obtained from the neural network architecture. Conversely, the second depth estimate for image regions including objects that were present in the training data may be associated with a lower measure of uncertainty.

The first depth estimate and the second depth estimate are probabilistically fused using the measures of uncertainty to generate a fused depth estimate for the scene. By combining the first and second depth estimates in this way, the accuracy of the fused depth estimate may be improved. For example, the first depth estimate (which is based on geometric constraints) may provide a reliable estimate of a relative depth of a portion of a scene, compared to a different portion of the scene. In this way, the first depth estimate may be able to place or otherwise locate the portion of the scene in an appropriate position within a real-world environment, for example relative to other portions of the scene. However, the first depth estimate may be less accurate in capturing a depth gradient within that portion of the scene, such as a change in depth within that portion of the scene, e.g. due to an uneven texture of a surface within that portion of the scene. In contrast, whereas the second depth estimate (as obtained from the neural network architecture) may accurately capture a depth gradient within a scene, it may less accurately locate a given portion of a scene compared to other portions of the scene. By probabilistically fusing the first and second depth estimates using the measures of uncertainty, though, the individual effects of each of the first and second depth estimates may be synergistically enhanced, so as to improve the accuracy of the fused depth estimate. For example, the measures of uncertainty may constrain the fusion of the first and second depth estimates, so as to ensure global consistency in the fused depth estimate. Furthermore, blurring artifacts in the estimated depth for the scene may be reduced compared to other methods.

Figure 1B:
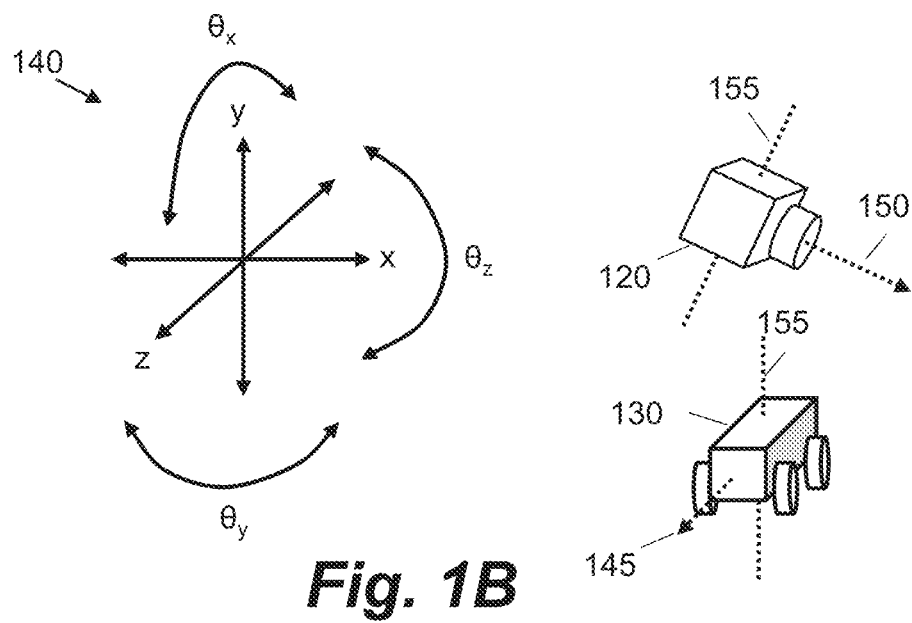
FIG. 1B is a schematic diagram showing available degrees of freedom for an example object in 3D space.
Figure 1C:
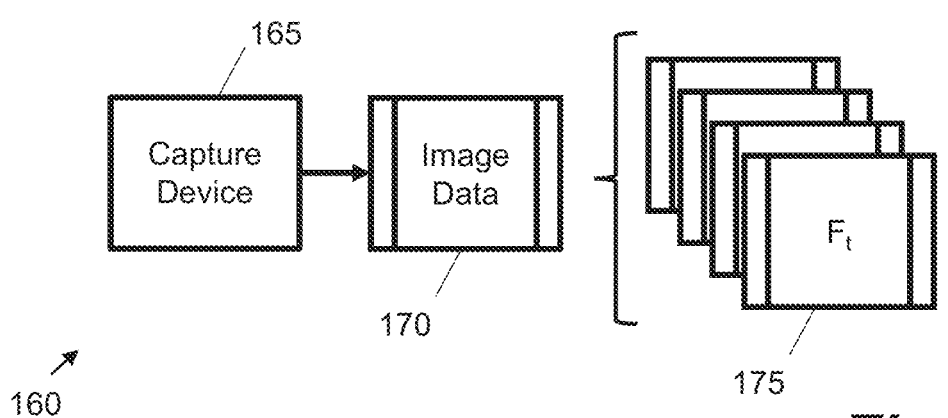
FIG. 1C is a schematic diagram showing video data generated by an example capture device.

FIGS. 1A and 1B schematically show an example of a 3D space and the capture of image data associated with that space. FIG. 1C then shows a capture device configured to generate image data when viewing the space. These examples are presented to better explain certain features described herein and should not be considered limiting; certain features have been omitted and simplified for ease of explanation.

FIG. 1A shows an example 100 of a 3D space 110. The 3D space 110 may be an internal and/or an external physical space, e.g. at least a portion of a room or a geographical location. The 3D space 110 in this example 100 comprises a number of physical objects 115 that are located within the 3D space. These objects 115 may comprise one or more of, amongst others: people, electronic devices, furniture, animals, building portions and equipment. Although the 3D space 110 in FIG. 1A is shown with a lower surface this need not be the case in all implementations, for example an environment may be aerial or within extra-terrestrial space.

The example 100 also shows various example capture devices 120-A, 120-B, 120-C (collectively referred to with the reference numeral 120) that may be used to capture video data associated with the 3D space 110. A capture device, such as the capture device 120-A of FIG. 1A, may comprise a camera that is arranged to record data that results from observing the 3D space 110, either in digital or analogue form. For example, the capture device 120-A may be a monocular capture device, such as a monocular camera. A monocular camera typically captures an image of a scene from one position at a time, and may have a single lens or lens system. In contrast, a stereo camera generally includes at least two lenses, with a separate image sensor for each lens. A monocular capture device useable as the capture device 120-A may be a monocular multi-directional camera device, arranged to capture an image of the 3D space 110 from a plurality of angular positions. In use, multiple images may be captured, one after each other. In certain cases, the plurality of angular positions cover a wide field of view. In a particular case, the capture device 120-A may comprise an omni-directional camera, e.g. a device arranged to capture a field of view of substantially 360 degrees. In this case, the omni-directional camera may comprise a device with a panoramic-annular lens, e.g. the lens may be mounted in relation to a charge-coupled array.

In order to capture a plurality of images of the 3D space from a plurality of different positions, the capture device 120-A may be moveable. For example, the capture device 120-A may be arranged to capture different frames corresponding to different observed portions of the 3D space 110. The capture device 120-A may be moveable with reference to a static mounting, e.g. may comprise actuators to change the position and/or orientation of the camera with regard to the 3D space 110. In another case, the capture device 120-A may be a handheld device operated and moved by a human user. In one case, the capture device 120-A may comprise a still image device, such as a camera, configured to capture a sequence of images; in another case, the capture device 120-A may comprise a video device to capture video data comprising a sequence of images in the form of video frames. For example, the capture device 120-A may be a monocular camera or a monocular capture device to capture or otherwise obtain frames of video data.

In FIG. 1A, multiple capture devices 120-B, C are also shown coupled to a robotic device 130 that is arranged to move within the 3D space 110. The robotic device 135 may comprise an autonomous aerial and/or terrestrial mobile device. In the present example 100, the robotic device 130 comprises actuators 135 that enable the device to navigate the 3D space 110. These actuators 135 comprise wheels in the illustration; in other cases, they may comprise tracks, burrowing mechanisms, rotors, etc. One or more capture devices 120-B, C may be statically or moveably mounted on such a device. In certain cases, a robotic device may be statically mounted within the 3D space 110 but a portion of the device, such as arms or other actuators, may be arranged to move within the space and interact with objects within the space. Each capture device 120-B, C may capture a different type of image data, video data and/or may comprise a stereo image source. In one case, at least one of the capture devices 120-B, C is configured to capture photometric data, e.g. colour or grayscale images. In one case, one or more of the capture devices 120-B, C may be moveable independently of the robotic device 130. In one case, one or more of the capture devices 120-B, C may be mounted upon a rotating mechanism, e.g. that rotates in an angled arc and/or that rotates by 360 degrees, and/or is arranged with adapted optics to capture a panorama of a scene (e.g. up to a full 360 degree panorama). It will be appreciated that, in some cases, a capture device similar to or the same as the capture device 120-A may be used as one or both of the capture devices 120-B, C of FIG. 1A.

FIG. 1B shows an example 140 of degrees of freedom available to a capture device 120 and/or a robotic device 130. In the case of a capture device such as 120-A, a direction 150 of the device may be co-linear with the axis of a lens or other imaging apparatus. As an example of rotation about one of the three axes, a normal axis 155 is shown in the Figures. Similarly, in the case of the robotic device 130, a direction of alignment 145 of the robotic device 130 may be defined. This may indicate a facing of the robotic device and/or a direction of travel. A normal axis 155 is also shown. Although only a single normal axis is shown with reference to the capture device 120 or the robotic device 130, these devices may rotate around any one or more of the axes shown schematically as 140 as described below.

More generally, an orientation and location of a capture device may be defined in three-dimensions with reference to six degrees of freedom (6DOF): a location may be defined within each of the three dimensions, e.g. by an [x, y, z] co-ordinate, and an orientation may be defined by an angle vector representing a rotation about each of the three axes, e.g. [$\theta_x$, $\theta_y$, $\theta_z$]. Location and orientation may be seen as a transformation within three-dimensions, e.g. with respect to an origin defined within a 3D coordinate system. For example, the [x, y, z] co-ordinate may represent a translation from the origin to a particular location within the 3D coordinate system and the angle vector—[$\theta_x$, $\theta_y$, $\theta_z$]—may define a rotation within the 3D coordinate system. A transformation having 6DOF may be defined as a matrix, such that multiplication by the matrix applies the transformation. In certain implementations, a capture device may be defined with reference to a restricted set of these six degrees of freedom, e.g. for a capture device on a ground vehicle the y-dimension may be constant. In certain implementations, such as that of the robotic device 130, an orientation and location of a capture device coupled to another device may be defined with reference to the orientation and location of that other device, e.g. may be defined with reference to the orientation and location of the robotic device 130.

In examples described herein, the orientation and location of a capture device, e.g. as set out in a 6DOF transformation matrix, may be defined as the pose of the capture device. Likewise, the orientation and location of an object representation, e.g. as set out in a 6DOF transformation matrix, may be defined as the pose of the object representation. The pose of a capture device may vary over time, e.g. as video data or a series of still images is recorded, such that a capture device may have a different pose at a time t+1 than at a time t. In a case of a handheld mobile computing device comprising a capture device, the pose may vary as the handheld device is moved by a user within the 3D space 110.

FIG. 1C shows schematically an example of a capture device configuration. In the example 160 of FIG. 1C, a capture device 165 is configured to generate image data 170. In FIG. 1C, the image data 170 comprises a plurality of frames 175. Each frame 175 may relate to a particular time t in a time period over which an image of a 3D space, such as 110 in FIG. 1, is captured (i.e. $F_t$). A frame 175 generally consists of a 2D representation of measured data. For example, a frame 175 may comprise a 2D array or matrix of recorded pixel values at time t. In the example of FIG. 1C, all frames 175 within the image data are the same size, although this need not be the case in all examples. Pixel values within a frame 175 represent a measurement of a particular portion of the 3D space. In FIG. 1C, the image data represents a plurality of views of the scene from a monocular capture device, each of which is captured at a different respective time t. However, in other cases, image data captured by a capture device (or an image or video capture system) may represent a plurality of views of the scene captured at the same or an at least partially overlapping time as each other. This may be the case where the capture device is a stereo capture system.

In the example of FIG. 1C, each frame 175 comprises photometric data. Photometric data typically represents photometric characteristics of an image, such as a brightness, intensity or colour. In FIG. 1C, each frame 175 includes the intensity values of each pixel of the frame 175, which may be stored with a greyscale or brightness level of, for example, from 0 to 255 per colour band or colour channel A greyscale level of 0 for example corresponds with a darkest intensity (e.g. black) and a greyscale level of 255 for example corresponds with a lightest intensity (e.g. white), with greyscale levels between 0 and 255 corresponding with an intermediate intensity between black and white. In FIG. 1C, the photometric data represents Red, Green, Blue pixel intensity values for a given resolution. Hence, each frame 175 represents a colour image, where each [x, y] pixel value in a frame comprises an RGB vector [R, G, B]. As an example, the resolution of the colour data may be 640 by 480 pixels. In other examples, other colour spaces may be used and/or the photometric data may represent other photometric characteristics.

The capture device 165 may be arranged to store the image data 170 in a coupled data storage device. In another case, the capture device 165 may transmit the image data 170 to a coupled computing device, e.g. as a stream of data or on a frame-by-frame basis. The coupled computing device may be directly coupled, e.g. via a universal serial bus (USB) connection, or indirectly coupled, e.g. the image data 170 may be transmitted over one or more computer networks. In yet another case, the capture device 165 may be configured to transmit the image data 170 across one or more computer networks for storage in a network attached storage device. The image data 170 may be stored and/or transmitted on a frame-by-frame basis or in a batch basis, e.g. a plurality of frames may be bundled together.

One or more pre-processing operations may also be performed on the image data 170 before it is used in the later-described examples. In one case, pre-processing may be applied such that the two frame sets have a common size and resolution.

In some cases, the capture device 165 may be configured to generate video data as a form of image data. Video data may, however, similarly represent a plurality of frames captured at a different respective time. In one case, video data captured by the capture device 165 may comprise a compressed video stream or file. In this case, frames of video data may be reconstructed from the stream or file, e.g. as the output of a video decoder. Video data may be retrieved from memory locations following pre-processing of video streams or files.

FIG. 1C is provided as an example and, as will be appreciated, different configurations than those shown in the Figure may be used to generate the image data 170 for use in the methods and systems described below. The image data 170 may further comprise any measured sensory input that is arranged in a two-dimensional form representative of a captured or recorded view of a 3D space. For example, this may comprise photometric data, depth data electromagnetic imaging, ultrasonic imaging and radar output, amongst others. In these cases, only an imaging device associated with the particular form of data may be required, e.g. an RGB device without depth data.

Figure 2:
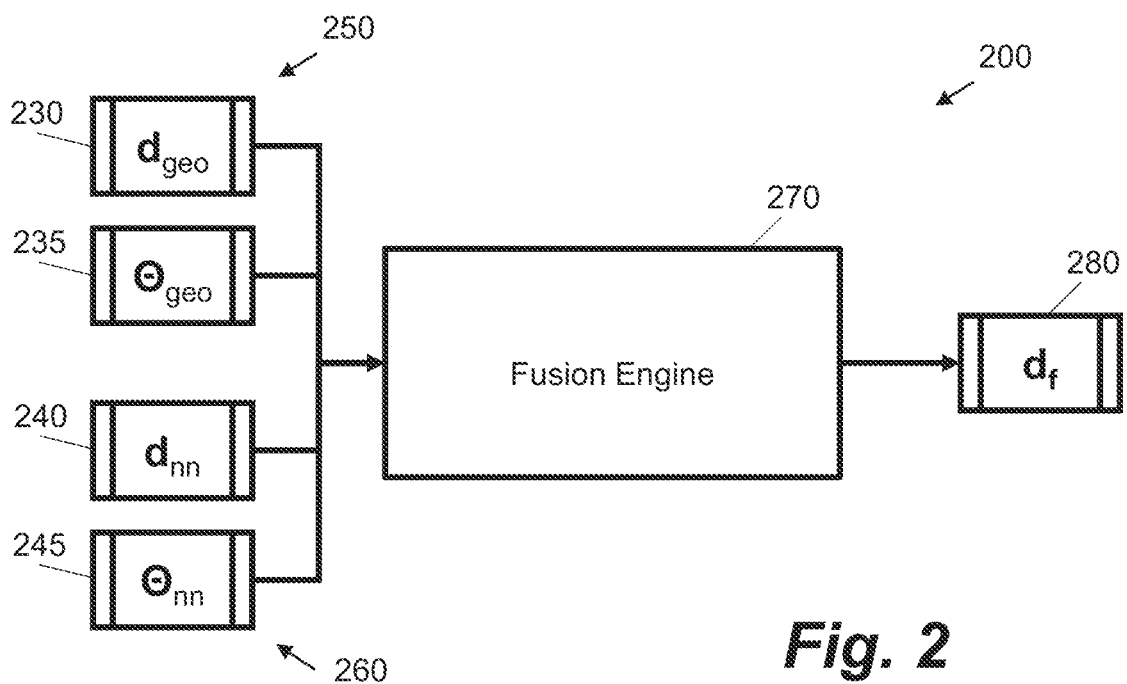
FIG. 2 is a schematic diagram of an image processing system according to an example.

FIG. 2 shows an example image processing system 200 for estimating a depth for a scene. In the image processing system 200 of FIG. 2, a first depth estimate 230 and a measurement of uncertainty 235 for the first depth estimate 230 are generated by a geometric reconstruction engine. The first depth estimate 230 and the measurement of uncertainty 235 for the first depth estimate 230 may be collectively referred to as first depth data 250. The geometric reconstruction engine is for example configured to obtain the first depth estimate 230 by processing at least two images of the scene. As described with reference to FIGS. 1A-C, the at least two images may be captured using any suitable capture device, and may be represented as image data such as RGB data. The geometric reconstruction engine may utilise photometric techniques to generate the first depth estimate 230. For example, a given portion of the scene should have the same photometric characteristics (such as a brightness, intensity and/or colour) irrespective of a position of a capture device used to obtain an image of the portion of the scene. This may be exploited by the geometric reconstruction engine to generate the first depth estimate 230. As an example, the geometric reconstruction engine may process at least two images of the same scene, captured from different respective positions, to determine a depth of a given portion of the scene which minimizes a photometric error. For example, a photometric error may be minimized where the first depth estimate 230 is closest to the actual depth of the given portion of the scene. This is merely an example, though, and other geometric techniques may be used to generate the first depth estimate 230 in other examples. In particular, although geometric reconstruction techniques described herein, e.g. with reference to FIG. 2, use two images, e.g. as may be obtained using a monocular system, in other examples one or more images may be used, e.g. in the case of a single stereo image.

In certain cases, image data representative of two or more views of the scene are obtained from a capture device, such as a camera, prior to generating the first depth estimate 230. In such cases, generating the first depth estimate 230 comprises obtaining a pose estimate for the camera and generating the first depth estimate 230 by minimizing a photometric error which is a function of at least the pose estimate and the image data.

A pose estimate of a camera typically indicates a position and orientation of the camera during capture of the image represented by the image data. Where the image data represents a series of views, which e.g. correspond to frames of a video, the pose estimate may indicate the position and orientation of the camera as time progresses through the frames of the video. For example, the image data may be obtained by moving a camera (such as an RGB camera) around an environment (such as an interior of a room). At least a subset of the frames of the video (and hence a subset of the images represented by the image data) may thus have corresponding pose estimates representing the position and orientation of the camera at the time the frame was recorded. Pose estimates may not exist for all frames of a video (or all images of a series of images), but may be determined for a subset of times within the recorded time range of the video or a subset of images of a plurality of images obtained by the camera.

Various different methods may be used to obtain the pose estimate for the camera. For example, the pose of the camera may be estimated from using a known SLAM system that receives the image data and outputs a pose, may be estimated using sensors of the camera that indicate position and orientation, and/or using custom pose tracking methods. In a SLAM system, for example, the pose of the camera may be estimated based on processing of images captured by the camera over time.

By minimizing a photometric error which is a function of at least the pose estimate and the image data, the first depth estimate 230 can be obtained. In some cases, a mapping function may be applied to map a pixel in a first image (corresponding to a first view of the scene) to a corresponding position in a second image (corresponding to a second view of the scene), to obtain a remapped version of the first image. Such a mapping function, for example, depends on an estimated pose of the camera during capture of the first image and a depth of the pixel in the first image. A photometric characteristic may then be determined for each of the pixels in the remapped version of the first image (e.g. using an intensity function that returns an intensity value of a given pixel). A corresponding photometric characteristic may then be determined for each of the pixels in the first image (as obtained by the camera) using the same intensity function. As a photometric characteristic (such as a pixel intensity value) associated with a pixel of a given depth should be independent of a camera pose, the photometric characteristics for the remapped version of the first image and the first image itself should be the same if the depth is correctly estimated. In this way, the depth of the pixel in the first image may be iteratively altered and a photometric error (which is for example based on a difference between the photometric characteristics of the first image and the remapped version of the first image) may be calculated for each iteration. The first depth estimate 230 for a given pixel may be taken as the depth value which minimizes such a photometric error. In examples, the depth estimates that are iteratively used during the photometric error minimization process may lie along an epipolar line in an image. If there is already a depth estimate for a given pixel (e.g. obtained from a previous frame or image with a pixel corresponding to the given pixel), the depth estimates that are iteratively input to the photometric error calculation may be within a given range of the previous depth estimate, e.g. within plus or minus 2 times a measurement of uncertainty associated with the previous depth estimate. This may improve the efficiency of the generation of the first depth estimate 230, by concentrating the search for an appropriate depth value in a more likely range of depth values. In certain cases, an interpolation may be performed between two neighbouring depth values which are around or include a depth value associated with a minimal photometric error. A suitable method for obtaining the first depth estimate 230 is described in the paper "Semi-Dense Visual Odometry for a Monocular Camera", by J. Engel et al, which was published in the Proceedings of the International Conference on Computer Vision (ICCV), 2013. However, other methods may instead be used.

There is typically an uncertainty associated with the first depth estimate 230. The uncertainty for example represents the degree of confidence that the first depth estimate 230 correctly corresponds to the actual depth. For example, the uncertainty may depend on a photometric uncertainty (which may be limited by or depend on the photometric resolution of the capture device), which may limit the accuracy with which the first depth estimate 230 may be made. The uncertainty may further or instead depend on the method used to generate the first depth estimate 230 and any inherent uncertainties associated with this method, such as a step-size between neighbouring interpolation points if the generation of the first depth estimate 230 involves an interpolation process. The uncertainty may be considered to correspond to an error associated with the first depth estimate 230. In the example of FIG. 2, the geometric reconstruction engine is configured to output both the first depth estimate 230 and a measurement of uncertainty 235 for the first depth estimate 230. The geometric reconstruction engine may be arranged to generate an array or matrix containing a mean, $\mu$, corresponding to the first depth estimate 230, and a variance, $\theta$, corresponding to the measurement of uncertainty 235, although this is merely an example. The mean and variance may be provided for one or more of: the whole image, one or more image portions and pixels of the image.

In examples in which the generation of the first depth estimate 230 involves the minimization (or other optimization) of a photometric error, the measurement of uncertainty 235 associated with the first depth estimate 230 may be obtained by computing a Jacobian term, J, based on a difference in a photometric error between two depth values used for interpolation to obtain the first depth estimate 230, and based on a difference between these two depth values. The uncertainty, $\theta_{geo}$, of the first depth estimate 230 in such cases may be taken as:

$$\theta_{geo} = (J^T J)^{-1}$$

However, this is merely an example, and other uncertainty measurements may be used in other examples.

In certain cases, the first depth estimate 230 may be a first depth map for a plurality of pixels. For example, the first depth estimate 230 may include a per-pixel depth estimate for each pixel of an input image of the scene. Hence, the resolution of the input image and a first depth map corresponding to the first depth estimate 230 may be the same. It is to be appreciated that, prior to generation of the first depth estimate 230, the input image may have undergone preprocessing, which may include altering a resolution of the input image. For example, a resolution of the input image may have been reduced, e.g. by downsampling the image, to reduce computational requirements for processing of the input image. In other cases, the first depth estimate 230 may include a single depth value for a plurality of pixels, with a one-to-many correspondence between a depth value and pixels of an input image. For example, a plurality of pixels may be combined together, e.g. images with similar photometric characteristics, such as a similar colour or intensity, and a depth value may be obtained for this combination of pixels.

In some cases, the first depth estimate 230 may be a so-called "semi-dense" depth estimate. In such cases, the first depth estimate 230 may include depth estimates for a sub-set of portions of a scene, e.g. as captured in an input image (or plurality of images). For example, a semi-dense depth estimate may include depth estimates for a portion of pixels in image data representative of two or more views of a scene, which e.g. correspond to a portion of the two or more views of the scene. The portions of a scene for which the first depth estimate 230 is obtained may correspond to the portions of pixels which satisfy certain image criteria, such as certain photometric criteria. For example, the first depth estimate 230 may be obtained for portions of an image which are identified as including a sufficient amount of detail or information. This may be identified by calculating an image gradient, which for example indicates a change of photometric characteristics (such as a brightness or colour) over a given region. An image gradient may correspond to or be used as a proxy for a depth gradient, indicating a change in depth over a given region of a scene. In image regions with a large amount of detail, e.g. corresponding to feature-rich parts of a scene, with relatively large changes in depth in a relatively small region of the scene, the image gradient is typically relatively large. In other cases, the first depth estimate 230 may be a so-called "sparse" depth estimate. In these cases, the first depth estimate 230 may be obtained for portions of an image which have been identified as corresponding to particular image features. For example, keypoints of the image may be identified, which typically correspond to distinctive locations in an image, which may be robustly localisable from a range of viewpoints, rotations, scales and illuminations. In such cases, the first depth estimate 230 may be obtained for image patches including keypoints, without obtaining depth estimates for other image portions. In yet further cases, the first depth estimate 230 may be a so-called "dense" depth estimate, in which a depth estimate is obtained for an entire image (or image portion), irrespective of a content of the image or image portion.

In some cases, the measurement of uncertainty 235 for the first depth estimate 230 may be of the same type as, or include the same resolution as, the first depth estimate 230. For example, if the first depth estimate 230 includes a depth estimate per pixel of an input image, there may be a corresponding uncertainty measurement for each pixel too. Conversely, if the first depth estimate 230 includes a depth estimate for a plurality of pixels of an input image, there may be a corresponding uncertainty measurement for that plurality of pixels too. Similarly, if the first depth estimate 230 is sparse, semi-dense or dense, the measurement of uncertainty 235 may also be sparse, semi-dense or dense, respectively. In other cases, though, a type or resolution of the measurement of uncertainty 235 may differ from that of the first depth estimate 230.

The image processing system 200 of FIG. 2 is also arranged to generate a second depth estimate 240 and a measurement of uncertainty 245 for the second depth estimate 240, which may be referred to collectively as second depth data 260. The second depth data 260 may be generated using a neural network architecture, which may be trained on unsupervised or supervised (i.e. labelled) image data, to predict depth estimates and associated uncertainty measures. Various different neural network architectures may be used. For example, the neural network architecture may include at least one convolutional neural network (CNN), which may be a so-called "deep" neural network, with a plurality of layers.

In certain examples, image data representative of one or more views of a scene may be obtained from a capture device, such as a camera, prior to generating the first depth estimate 230. In such cases, generating the second depth estimate 240 may include receiving the image data at the neural network architecture. The image data may be in any suitable format, and may for example represent a plurality of 2D images of the scene, captured from a plurality of different positions. A depth estimate may then be predicted, using the neural network architecture and for each of a set of image portions, to generate the second depth estimate 240. The set of image portions may correspond to an entirety of an image (or a plurality of images), or a subset of an image or plurality of images.

Similarly to the first depth estimate 230, the second depth estimate 240 may be a second depth map for a plurality of pixels, e.g. with a one-to-one mapping between a depth value and a pixel of an input image of the scene. In other cases, though, the second depth estimate 240 may include a single depth value for a plurality of pixels, with a one-to-many correspondence between a depth value and pixels of an input image. Furthermore, the second depth estimate 240 may be a sparse, semi-dense or dense depth estimate. In one case, the two depth estimates have different densities, e.g. the first depth estimate 230 may be a semi-dense depth estimate and the second depth estimate 240 may be a dense depth estimate. In addition, as explained with reference to the first depth estimate 230, the measure of uncertainty 245 for the second depth estimate 240 may be of the same or a different type or resolution as that of the second depth estimate 240.

The image processing system 200 of FIG. 2 includes a fusion engine 270, which is configured to receive the first depth estimate 230 and the measurement of uncertainty 235 for the first depth estimate 230 from the geometric reconstruction engine, and the second depth estimate 240 and the measurement of uncertainty 245 for the second depth estimate 240 from the neural network architecture. The fusion engine 270 is configured to use the measurement of uncertainty 235 for the first depth estimate 230 and the measurement of uncertainty 245 for the second depth estimate 240 to probabilistically fuse the first depth estimate 230 and the second depth estimate 240 to output a fused depth estimate 280 for the scene. In this way, both the first and second depth estimates 230, 240 contribute to the fused depth estimate 280, which may improve the accuracy of the fused depth estimate 280 compared to the first or second depth estimate 230, 240 taken alone.

For example, the uncertainty of the first depth estimate 230 (which is based on geometric constraints) may be higher in regions of a scene with low texture, e.g. with relatively unchanging or slowly changing depth, such as a wall. Furthermore, the first depth estimate 230 may in addition or alternatively be relatively uncertain in regions in which a portion of a scene is partly occluded. In contrast, the second depth estimate 240 (obtained by the neural network architecture) may have a lower uncertainty than the first depth estimate 230 in ambiguous regions (e.g. low texture regions), but may be less accurate in high texture regions that are nevertheless accurately captured by the first depth estimate 230. Use of the measurements of uncertainty 235, 245 aids the probabilistic fusion of the first and second depth estimates 230, 240 by, for example, appropriately balancing the contribution of each of the first and second depth estimates 230, 240 to the fused depth estimate 280 based on their relative uncertainties. For example, the second depth estimate 240 may contribute to the fused depth estimate 280 a greater extent than the first depth estimate 230 in regions of the scene with a higher measurement of uncertainty 235 associated with the first depth estimate 230 than the measurement of uncertainty 245 associated with the second depth estimate 240. Moreover, global consistency may be maintained, so that the fused depth estimate 280 accurately captures a depth of a scene at a global level, rather than merely in selected local scene regions.

In certain cases, the first depth estimate 230 is a semi-dense depth estimate and the second depth estimate 240 and the fused depth estimate 280 each comprise a dense depth estimate. For example, the first depth estimate 230 may be obtained for portions of a scene with sufficient texture, for which the first depth estimate 230 may be adequately accurate. In such cases, the first depth estimate 230 may not be obtained for other portions of the scene that lack texture. However, the second depth estimate 240 may be obtained for the entirety of the scene as captured in an image (or image portion). Hence, by fusing the first and second depth estimates 230, 240 in such cases, the fused depth estimate 280 may also be obtained for the entirety of the scene as captured in the image. In such cases, a portion of the fused depth estimate 280 may be obtained by fusing both the first and second depth estimates 230, 240 (e.g. a portion of the fused depth estimate 280 corresponding to a more textured part of the scene). However, a different portion of the fused depth estimate 280 may be obtained solely from the second depth estimate 240 (such as a portion of the fused depth estimate 280 corresponding to a smooth part of the scene, for which the first depth estimate 230 may be less reliable).

Various different methods may be used to probabilistically fuse the first and second depth estimates 230, 240. For example, a cost function based on the first and second depth estimates 230, 240 and the measurements of uncertainty 235, 245 may be optimized in order to probabilistically fuse the first and second depth estimates 230, 240 and obtain the fused depth estimate 280. Optimization of a cost function may involve iteratively calculating a value of the cost function for different input depth estimates, so as to obtain the fused depth estimate 280 for which a minimum value of the cost function is obtained. A cost function may be alternatively be referred to as a loss or error function.

In the example of FIG. 2, the cost function comprises a first cost term associated with the first depth estimate 230 and a second cost term associated with the second depth estimate 240. The first cost term comprises a function of fused depth estimate values, first depth estimate values (e.g. taken from the first depth estimate 230 obtained from the geometric reconstruction engine) and uncertainty values for the first depth estimate 230 (e.g. taken from the measurement of uncertainty 235 for the first depth estimate 230). Similarly, the second cost term comprises a function of fused depth estimate values, second depth estimate values (e.g. taken from the second depth estimate 240 obtained from the neural network architecture), and uncertainty values for the second depth estimate 240 (e.g. taken from the measurement of uncertainty 245 for the second depth estimate 240). The cost function is optimised to determine the fused depth estimate values, which form the fused depth estimate 280 output by the fusion engine 270. This, for example, involves iteratively altering the fused depth estimate values to determine the fused depth estimate values for which the cost function is optimized. For example, the cost function may be considered to be optimized where its value meets a predefined criterion, e.g. where its value meets or is below a predefined minimum value. In other cases, optimization of the cost function may include minimization of the cost function. In this way, both the first and second depth estimates 230, 240 and the measurements of uncertainty 235, 245 act as a constraint on the fused depth estimate 280 obtained, improving the accuracy of the fused depth estimate 280.

It is to be appreciated, though, that the use of a cost function is merely an example. In other examples, the first and second depth estimates may be probabilistically fused, using the measurements of uncertainty, in a different way.

Certain examples herein therefore provide for accurate reconstruction of a depth estimation for a scene and therefore facilitate interaction between a robotic device and a real-world environment. In particular, certain examples herein are designed to enable real-time or near real-time operation (in contrast to other approaches for depth estimation), and provide for the estimation of a depth of scene in a variety of different environments, including outdoor and indoor locations.

Figure 3:
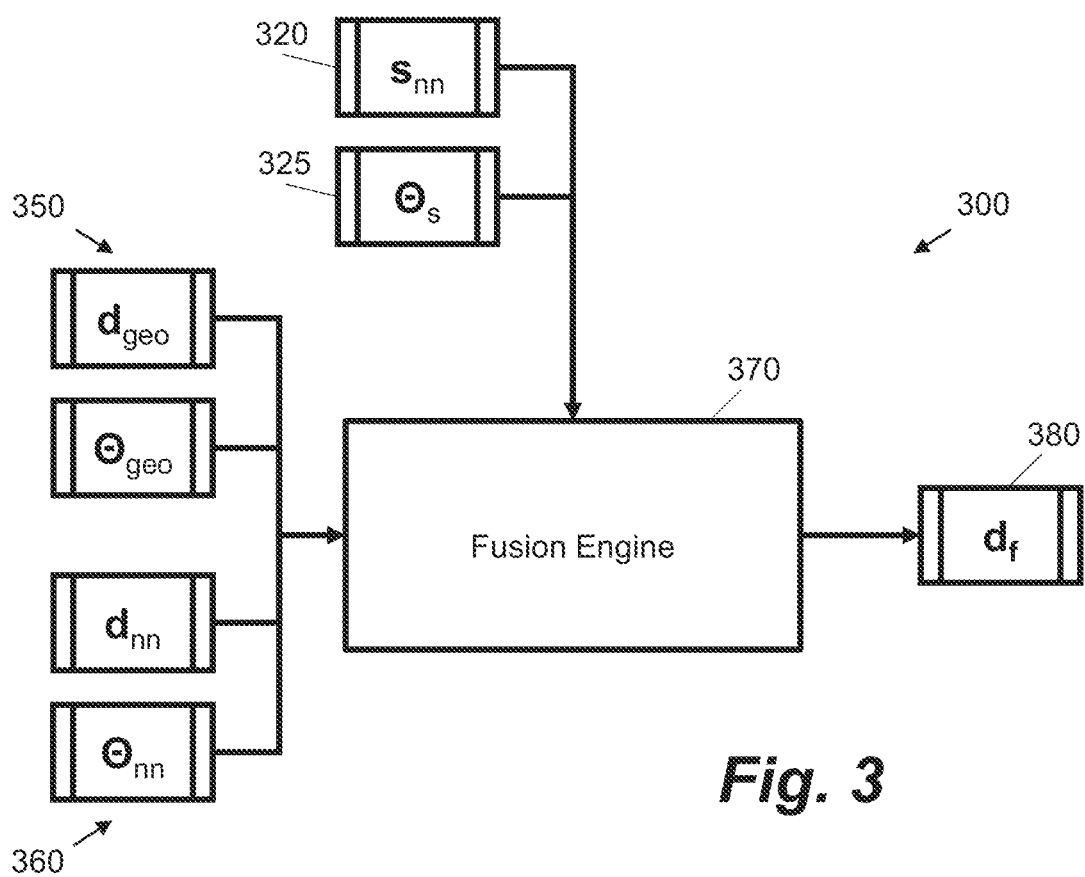
FIG. 3 is a schematic diagram of an image processing system according to a further example.

FIG. 3 is a schematic diagram of an image processing system 300 according to a further example. The image processing system 300 of FIG. 3 is similar to the image processing system 200 of FIG. 2 in various respects. Features of FIG. 3 that are the same as corresponding features of FIG. 2 are labelled with the same reference numeral but incremented by 100.

In FIG. 3, the fusion engine 370 is configured to receive a surface orientation estimate 320, and a measure of uncertainty 325 for the surface orientation estimate 320, in addition to the first and second depth estimates and the measures of uncertainty. The fusion engine 370 is configured to use the surface orientation estimate 320, and the measure of uncertainty 325 for the surface orientation estimate 320, to probabilistically fuse the first depth estimate and the second depth estimate.

The surface orientation estimate 320 for example indicates a direction or an inclination of a surface corresponding to a pixel or other image region for an image of a scene as captured by a capture device. For example, an orientation of a surface may be considered to capture an angle of orientation of a surface of a pixel or other image region for an image of a scene as captured by a capture device. The surface orientation for example corresponds to a surface normal, which is an axis that is perpendicular to a given surface. In other cases, the surface orientation estimate 320 may correspond to a surface gradient, e.g. a measure of a rate of change of a surface. The surface orientation of a plurality of pixels may be used to obtain an indication of the nature of the surface corresponding to the plurality of pixels. For example, a surface which is relatively smooth and unchanging may have a relatively constant surface orientation. Conversely, a highly textured surface may be associated with a variety of different surface orientations.

The surface orientation estimate 320 and the measure of uncertainty 325 for the surface orientation estimate 320 may be obtained in various different ways. For example, an image of the scene may be processed to determine the surface orientation estimate 320 and the measure of uncertainty 325 for the surface orientation estimate 320, e.g. based on changes in photometric characteristics such as pixel intensity values of pixels of the image.

Figure 4:
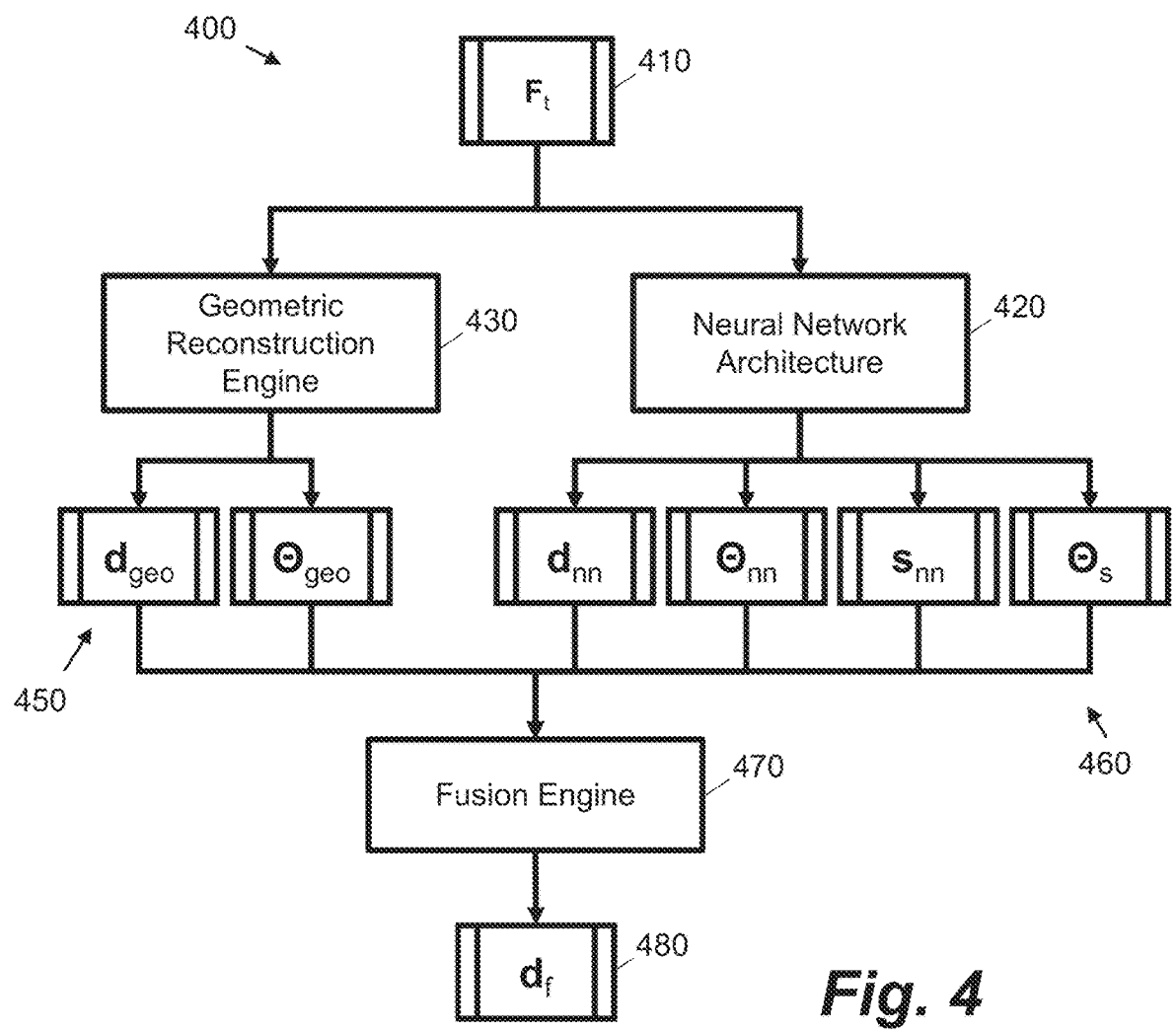
FIG. 4 is a schematic diagram of an image processing system according to a yet further example.

FIG. 4 is a schematic diagram of an image processing system 400 according to a still further example. The image processing system 400 of FIG. 4 is similar to the image processing system 300 of FIG. 3 in various respects, but explicitly illustrates a geometric reconstruction engine 430 and a neural network architecture 420.

In FIG. 4, a frame 410 of video data is received. The frame 410 is for example captured by a capture device such as a camera, and includes a view of a scene. It is to be appreciated that, in other cases, the image processing system 400 of FIG. 4 may be used to process image data representative of still images, rather than video data representative of a video.

The frame 410 is processed by the geometric reconstruction engine 430 and the neural network architecture 420. The geometric reconstruction engine 430 and the neural network architecture 420 may be configured as described with reference to FIG. 2 to generate the first depth data 450 and the second depth data 460.

In the example of FIG. 4, the second depth data 460 includes a surface orientation estimate, and a measure of uncertainty for the surface orientation estimate. In this example, the surface orientation estimate and the measure of uncertainty for the surface orientation estimate are generated by the neural network architecture 420, in addition to the second depth estimate and the measurement of uncertainty for the second depth estimate.

The neural network architecture 420 of FIG. 4 may include one or more neural networks, and is configured to receive pixel values for frames of video data, such as the frame 410 shown in FIG. 4. The neural network architecture 420 is configured to predict a depth estimate for each of a first set of image portions to generate the second depth estimate, as well as at least one surface orientation estimate for each of a second set of image portions. The first set of image portions may be the same as or different from the second set of image portions. For example, the first and second sets of image portions may be entirely overlapping, partially overlapping or entirely non-overlapping. The depth estimate and the at least one surface orientation may be obtained at different respective resolutions. In such cases, a resolution of one or both the depth estimate and the at least one surface orientation may subsequently be altered, e.g. by interpolation, to obtain a desired resolution. For example, at least one surface orientation may be obtained at a lower resolution than the depth estimate but may subsequently be upscaled to the same resolution as the depth estimate. The neural network architecture 420 is also configured to predict one or more uncertainty measures associated with each depth estimate and one or more uncertainty measures associated with each surface orientation estimate.

The first depth data 450 and the second depth data 460 are probabilistically fused using the fusion engine 470 to obtain the fused depth estimate 480. In Figure, the fusion engine 470 also uses the at least one surface orientation to obtain the fused depth estimate 480. In the example in which a cost function is optimized to obtain the fused depth estimate 480, the cost function may include a third cost term associated with the at least one surface orientation estimate. In such cases, the third cost term may comprise a function of fused depth estimate values, surface orientation estimate values (e.g. as obtained from the neural network architecture 420), and uncertainty values for each of the at least one surface orientation estimate (e.g. taken from the measurement of uncertainty for each respective surface orientation estimate). For example, the third cost term may include a sum of cost terms for each respective surface orientation estimate. The optimization of the cost function may be as described with respect to FIG. 2, but with the addition of the surface orientation information.

Using surface orientation information to obtain the fused depth estimate 480 may further improve the accuracy of the fused depth estimate 480. For example, a surface orientation estimate (and its associated measurement of uncertainty) may impose constraints between a given pixel and its neighbouring pixels. In this way, the global consistency of the fused depth estimate 480 may be improved.

Figure 5:
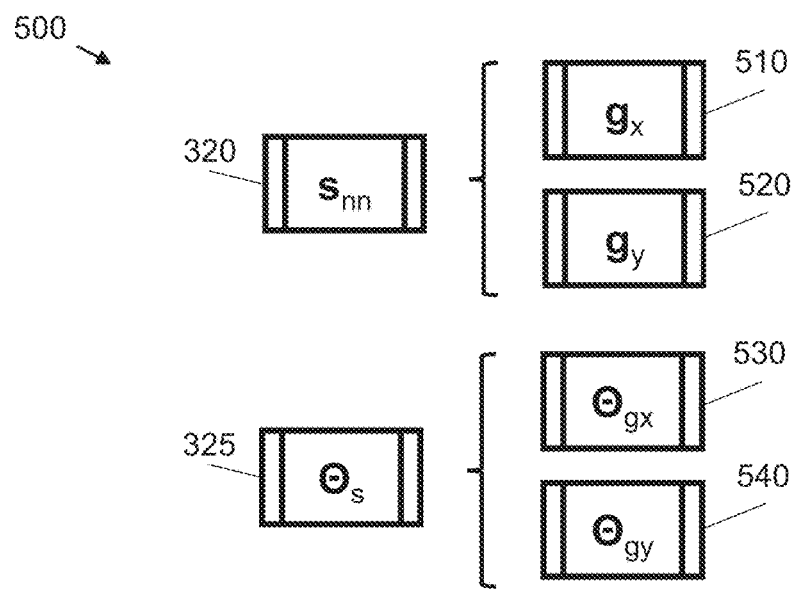
FIG. 5 is a schematic diagram showing a surface orientation estimate and a measure of uncertainty for the surface orientation estimate according to an example.

FIG. 5 is a schematic diagram showing a surface orientation estimate 320 and a measure of uncertainty 325 for the surface orientation estimate 320 according to an example 500. In FIG. 5, the surface orientation estimate 320 includes a depth gradient estimate 510 in a first direction (along an x-axis in this case) and a depth gradient estimate 520 in a direction orthogonal to the first direction (along a y-axis in this case, in which there is a Cartesian coordinate system).

A depth gradient estimate in a given direction for example represents an estimate of a change in the depth of a scene (for example as captured in an image) in that given direction. A depth gradient estimate may be used to identify rapid or distinctive changes in depth in an image of a scene. For example, a depth gradient may be relatively high in a region of the image that corresponds to a portion of a scene for which the depth differs across the portion of the scene. Conversely, a depth gradient may be relatively low in other regions of the image that correspond to a different portion of a scene that is at a relatively constant depth compared to the camera. By estimating the depth gradient in two different directions (such as two directions that are orthogonal, i.e. perpendicular, to each other), the depth characteristics of the scene captured in the image may be more precisely and/or more efficiently identified.

In other examples, the surface orientation estimate 320 may include other orientation estimates in addition to or instead of the depth gradient estimates 510, 520. For example, the surface orientation estimate 320 may include a surface normal estimate.

In some cases, such as FIG. 5, there is a corresponding measure of uncertainty for each surface orientation estimate. Hence, in FIG. 5, there is a first measure of uncertainty 530 associated with the depth gradient estimate 510 in the first direction, and a second measure of uncertainty 540 associated with the depth gradient estimate 520 in the direction orthogonal to the first direction.

A measure of uncertainty for each surface orientation estimate may be generated in various different ways. For example, a neural network architecture (which may be used to generate the second depth estimate, which is probabilistically fused with the first depth estimate by the fusion engine) may be trained to generate surface orientation estimates and corresponding measures of uncertainty associated with a respective surface orientation estimate.

In some cases, the second depth estimate and/or the surface orientation estimate(s) may be log estimates. This may facilitate the generation of these estimates by the neural network architecture as negative values are numerically meaningful. Furthermore, a difference between two log-depths (which for example corresponds to a gradient of a log-depth) corresponds to the ratio of two depths, which is scale invariant. In addition, if log-depth gradients are predicted in two orthogonal directions (as in the example of FIG. 5), the probabilistic fusion of the second depth estimate with the first depth estimate (which for example uses the log-depth gradients) is linear, and may be performed without dot product and normalisation operations. Hence, the fusion process may be performed more efficiently than otherwise.

Figure 6:
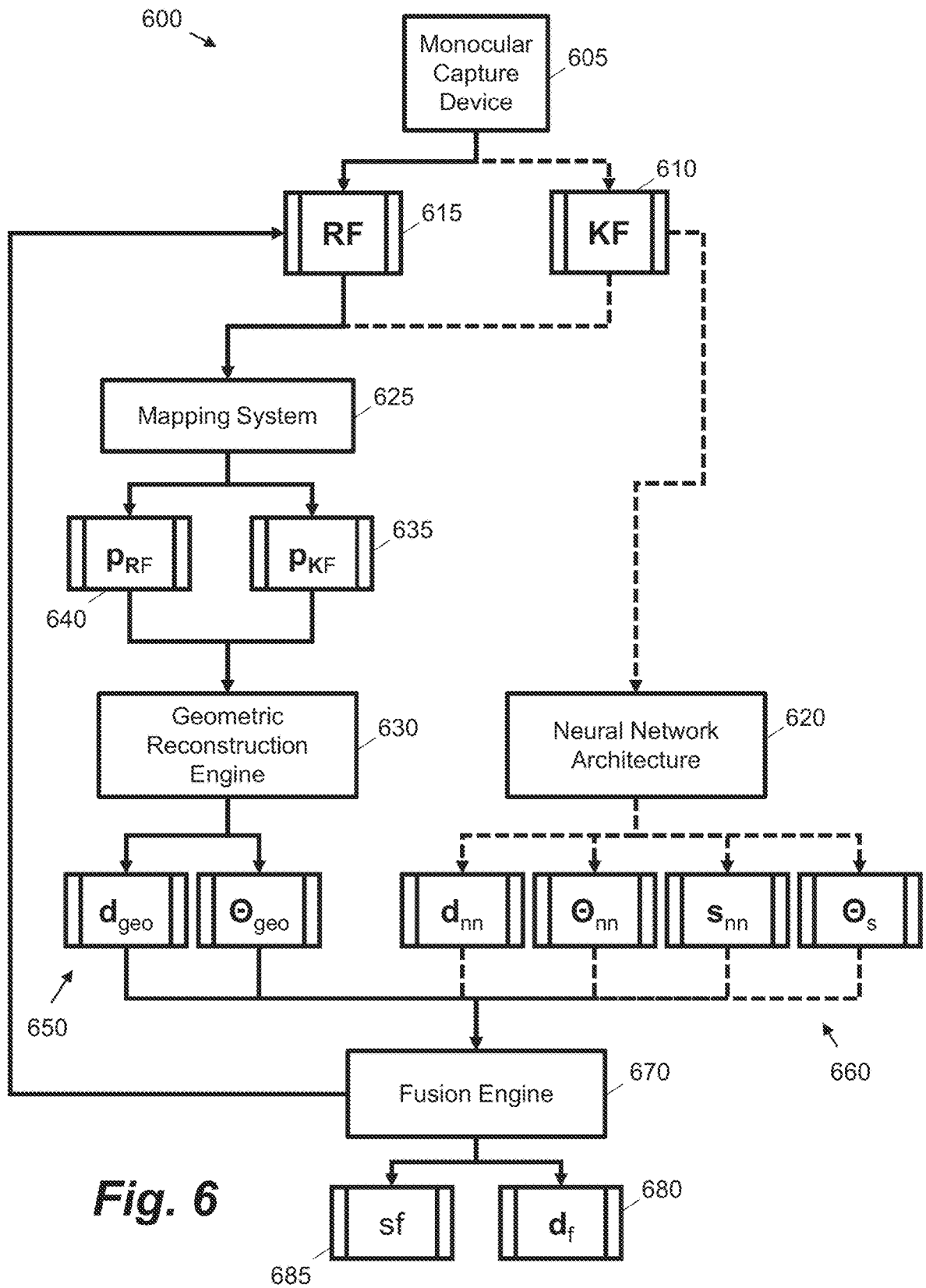
FIG. 6 is a schematic diagram of an image processing system according to a still further example.

FIG. 6 is a schematic diagram of an image processing system 600 according to a still further example. The image processing system 600 includes a monocular capture device 605, which is an example of a capture device or camera for capturing images of a scene. The monocular capture device 605 is arranged to capture video data representative of a video of the scene. The scene is captured in a first frame of video, which in the example of FIG. 6 is what may be referred to as a keyframe 610. A keyframe 610 for example corresponds to a frame of a video for which a more complete depth estimate is to be obtained, and for example corresponds to or includes a new portion of a scene for which a depth has not previously been estimated or a portion of a scene which is identified as being more feature-rich than other portions. For example, the first frame of a video, for which no depth estimate has been obtained previously, may be considered to be a keyframe. A key frame may be a key frame as designated by an external system, e.g. an external SLAM system. In other cases, a frame obtained after the monocular capture device 605 has moved by a distance exceeding a threshold distance may be a keyframe. Other frames captured by the monocular capture device 605 may be considered to be reference frames 615.

Frames captured by the monocular capture device 605 in the example of FIG. 6 (regardless of whether they are keyframes 610 or reference frames 615) are processed using a tracking system 625. The tracking system 625 is used to determine poses of the monocular capture device 605 during observation of the scene (for example during the capture of the frames). As explained with reference to FIG. 2, the tracking system 625 may include motion sensors, which may be coupled to or form part of an actuator arranged to move a robotic device coupled to or supporting the monocular capture device 605. In this way, the tracking system 625 may capture odometry data and process the odometry data to generate pose estimates for the monocular capture device 605.

In FIG. 6, the tracking system 625 generates an estimate 640 of the pose of the monocular capture device 605 during capture of the reference frame 615 and an estimate 635 of the pose of the monocular capture device 605 during capture of the keyframe. The estimated poses 640, 635 of the monocular capture device 605, and the video data captured by the monocular capture device 605, are used by a geometric reconstruction engine 630 to generate depth estimates for at least a subset of pixels from the frames of video data. The geometric reconstruction engine 630 in certain cases is configured to minimise a photometric error to generate the depth estimates. This is explained further with reference to FIG. 2. The geometric reconstruction engine 630 in FIG. 6 outputs first depth data 650 which includes the depth estimates and a measurement of uncertainty for the depth estimates.

In some cases, the first depth data 650 is regenerated for each frame obtained by the monocular capture device 605, e.g. the first depth data 650 may relate to the keyframe yet may be iteratively updated for each additional reference frame that is obtained and processed. The first depth data 650 may be generated in real-time or in near real-time, and may therefore be performed frequently, such as with a rate which corresponds to a frame rate of the monocular capture device 605.

For frames that are identified as corresponding to keyframes 610, the image processing system 600 of FIG. 6 additionally involves processing of the keyframe 610 using a neural network architecture 620 to generate second depth data 660. However, processing of reference frames 615 using the neural network architecture 620 may be omitted in some cases. This is indicated schematically in FIG. 6 by the use of dashed lines. The dashed lines correspond to portions of an image processing pipeline that may be selectively performed by the image processing system 600. For example, whereas the generation of the first depth data 650 may be performed for a frame irrespective of whether it is a reference frame 615 or a keyframe 610, the generation of the second depth data may be selectively performed for keyframes 610. In the example of FIG. 6, the second depth data 660 includes a second depth estimate, a measurement of uncertainty for the second depth estimate, at least one surface orientation estimate and a measurement of uncertainty for the surface orientation estimate, although this is merely an example. The neural network architecture 620 may be similar to or the same as the neural network architectures of other examples described herein.

The image processing system 600 of FIG. 6 also includes a fusion engine 670, which is configured to statistically fuse the first and second depth estimates (as obtained by the geometric reconstruction engine 630 and the neural network architecture 620, respectively), using the associated measurements of uncertainty. In FIG. 6, the fusion engine 670 also uses the at least one surface orientation estimate, and the respective measurement of uncertainty associated with the at least one surface orientation estimate, to statistically fuse the first and second depth estimates. However, use of the at least one surface orientation estimate, and the respective measurement of uncertainty associated with the at least one surface orientation estimate may be omitted in other cases.

The fusion engine 670 is configured to generate a fused depth estimate 680 by statistically fusing the first and second depth estimates. The fusion engine 670 of FIG. 6 is also configured to determine a scale estimate when probabilistically fusing the first depth estimate and the second depth estimate. For example, where the fusion engine 670 is configured to optimize a cost function to determine the fused depth estimate 680, optimizing the cost function may include determining a scale factor 685 for the fused depth estimate 680. In such cases, the scale factor 685 indicates a scale for the fused depth estimate 680 with respect to the scene. The scale factor may therefore compensate for inaccuracies in a scale of the scene as provided by the first and second depth estimates. The scale factor may be a scalar. For example, as the first depth estimates are generated based on poses provided by a monocular capture device 605 in FIG. 6, the first depth estimates have an arbitrary scale. However, generation of the scale factor allows an at-scale depth estimate to be obtained.

In cases in which the cost function is optimized to determine the fused depth estimate 680, a first cost term of the cost function may include a function of fused depth estimate values, first depth estimate values, uncertainty values for the first depth estimate, and a scale factor. Optimization of the cost function may include iteratively altering the scale factor as well as the fused depth estimate 680 to determine the scale factor and the fused depth estimate 680 that optimize (e.g. minimize) the cost function. In such cases, the cost function may also include a second cost term and/or a third cost term, as described with reference to FIGS. 2 and 4. In such cases, the second cost term and/or the third cost term may be independent of the scale factor.

As explained, the second depth data 660 may be generated by the neural network architecture 620 less frequently than generation of the first depth data 650 by the geometric reconstruction engine 630. For example, both the first depth data 650 and the second depth data 660 may be generated for keyframes 610. There may be fewer keyframes 610 than reference frames 615, for which generation of the second depth data may be omitted.

As an example, a scene may be captured in a first frame of video data, and a second depth estimate may be received for the first frame of video data. The second depth estimate may be generated by the neural network architecture 620. Hence, the first frame of video data may be considered to be a keyframe 615. In this example, a plurality of first depth estimates is obtained. At least one of the plurality of first depth estimates is generated using a second frame of video data that differs from the first frame of video data. For example, the plurality of first depth estimates (generated by the geometric reconstruction engine 630) may include a first depth estimate for the first frame (which is a keyframe 610) and a first depth estimate for the second frame (which is a reference frame 615). In this case, the fusion engine 670 is configured to iteratively output the fused depth estimate 680 for the scene, at each iteration processing the second depth estimate and one of the plurality of depth estimates. For example, upon receipt of the first frame, the fusion engine 670 may fuse the first depth estimate generated using the first frame and the second depth estimate generated using the first frame. However, upon receipt of the second frame, the fusion engine 670 may instead fuse the first depth estimate generated using the second frame and the second depth estimate that was previously generated using the first frame. In other words, the second depth estimate may not be re-generated for each frame, but may instead be re-used from previous frames (such as previous keyframes 615). In other words, the generation of the fused depth estimate 680 may be iteratively repeated. For a subsequent iteration, the method may involve determining whether to generate the second depth estimate. As explained above, such a determination may be made based on a content of the scene as captured in an image, such as whether it has changed noticeably compared to previous images of the scene (e.g. due to movement of the monocular capture device 605) or whether it is feature-rich. Responsive to a determination not to generate the second depth estimate (e.g. for reference frames 615), these examples involve probabilistically fusing the first depth estimate and the second depth estimate using a previous set of values for the second depth estimate. This obviates the need to process the image using the neural network architecture 620.

In examples such as this, first depth estimates may be generated more frequently than second depth estimates (which may be slower to generate, due to the use of the neural network architecture 620). In such cases, the fused depth estimate 680 may be refined based on updated first depth estimates and pre-existing second depth estimates.

Hence, the depth of a scene may be updated at a higher rate than in other cases in which the depth is updated after both the first and second depth estimates have been updated. Indeed, by generating the first and second depth estimates separately and subsequently fusing the first and second depth estimates, the methods herein are more flexible and may be performed more efficiently than otherwise.

Figure 7A:
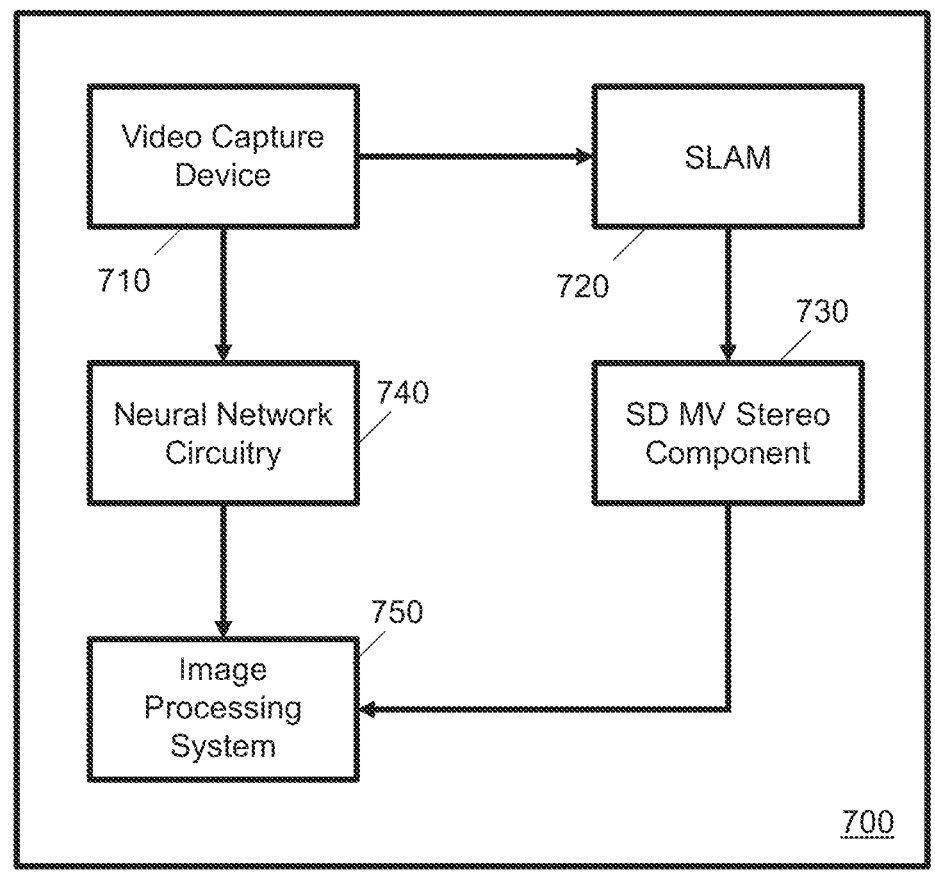
FIG. 7A is a schematic diagram showing components of a computing system according to an example.

FIG. 7A is a schematic diagram showing components of a computing system 700 which may be used to implement any of the methods described herein. The computing system 700 may be a single computing device (e.g. a desktop, laptop, mobile and/or embedded computing device) or may be a distributed computing system, which is distributed over multiple discrete computing devices (e.g. certain components may be implemented by one or more server computing devices based on requests from one or more client computing devices made over a network).

The computing system 700 includes a video capture device 710 to provide frames of video, which for example include observations of a scene. The computing system 700 also includes a simultaneous localisation and mapping (SLAM) system 720. A SLAM system within the field of robotic mapping and navigation acts to construct and update a map of an unknown environment while simultaneously locating a robotic device associated with the map within the environment. For example, the robotic device may be the device that is constructing, updating and/or using the map. The SLAM system 720 is arranged to provide pose data for the video capture device 710. A semi-dense multi-view stereo component 730 of the computing system 700 is arranged to receive the pose data and the frames of video and to implement the geometric reconstruction engine described in other examples above. The semi-dense multi-view stereo component 730 may be said to be "semi-dense" as described above; the term "multi-view stereo" indicates that the component 730 acts to simulate a stereo image pair to determine depth data by instead using successive frames of data from a monocular (e.g. non-stereo) camera. In this case, frames from a moving camera may provide different views of a common environment, allowing depth data to be generated as previously discussed. The computing system 700 also includes neural network circuitry 740, which is, for example, electronic circuitry to implement the neural network architecture described with reference to the examples above. The computing system 700 also includes an image processing system 750 which is arranged to implement the fusion engine of examples herein. The image processing system 750 for example probabilistically fuses first depth data from the semi-dense multi-view stereo component 730 and second depth data from the neural network circuitry 740 to obtain fused depth data.

Figure 7B:
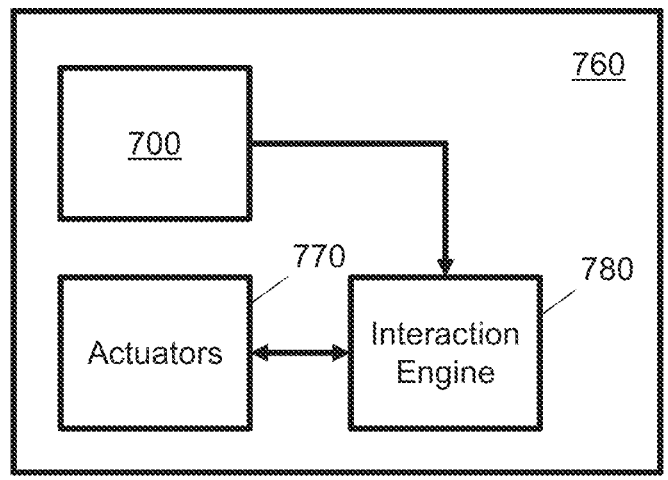
FIG. 7B is a schematic diagram showing components of a robotic device according to an example.

FIG. 7B is a schematic diagram showing components of a robotic device 760 according to an example. The robotic device 760 includes the computing system 700 of FIG. 7A. The robotic device 760 also includes one or more actuators 770 to enable the robotic device 760 to interact with a surrounding three-dimensional environment. At least a portion of the surrounding three-dimensional environment may be shown in the scene captured by the video capture device 710 of the computing system 700. In the case of FIG. 7B, the robotic device 760 may be configured to capture video data as the robotic device navigates a particular environment (e.g. as per device 130 in FIG. 1A). In another case, though, the robotic device 760 may scan an environment, or operate on video data received from a third party, such as a user with a mobile device or another robotic device. As the robotic device 760 processes the video data, it may be arranged to generate a depth estimate of a scene, which is for example a fused depth estimate.

The robotic device 760 also includes an interaction engine 780 comprising at least one processor to control the one or more actuators 770. The interaction engine 780 of FIG. 7B is configured to use the fused depth estimate to interact with the surrounding three-dimensional environment. The interaction engine 780 may use the fused depth estimate to control the one or more actuators 770 to interact with the environment. For example, the fused depth estimate may be used to grab objects within an environment, and/or avoid collisions with barriers such as walls.

Examples of functional components as described herein with reference to FIGS. 7A and 7B may comprise dedicated processing electronics and/or may be implemented by way of computer program code executed by a processor of at least one computing device. In certain cases, one or more embedded computing devices may be used. Components as described herein may comprise at least one processor operating in association with memory to execute computer program code loaded onto a computer readable medium. This medium may comprise solid state storage such as an erasable programmable read only memory and the computer program code may comprise firmware. In other cases, the components may comprise a suitably configured system-on-chip, application-specific integrated circuit and/or one or more suitably programmed field-programmable gate arrays. In one case, the components may be implemented by way of computer program code and/or dedicated processing electronics in a mobile computing device and/or a desktop computing device. In one case, the components may be implemented, as well as or instead of the previous cases, by one or more graphical processing units executing computer program code. In certain cases, the components may be implemented by way of one or more functions implemented in parallel, e.g. on multiple processors and/or cores of a graphics processing unit.

Figure 8:
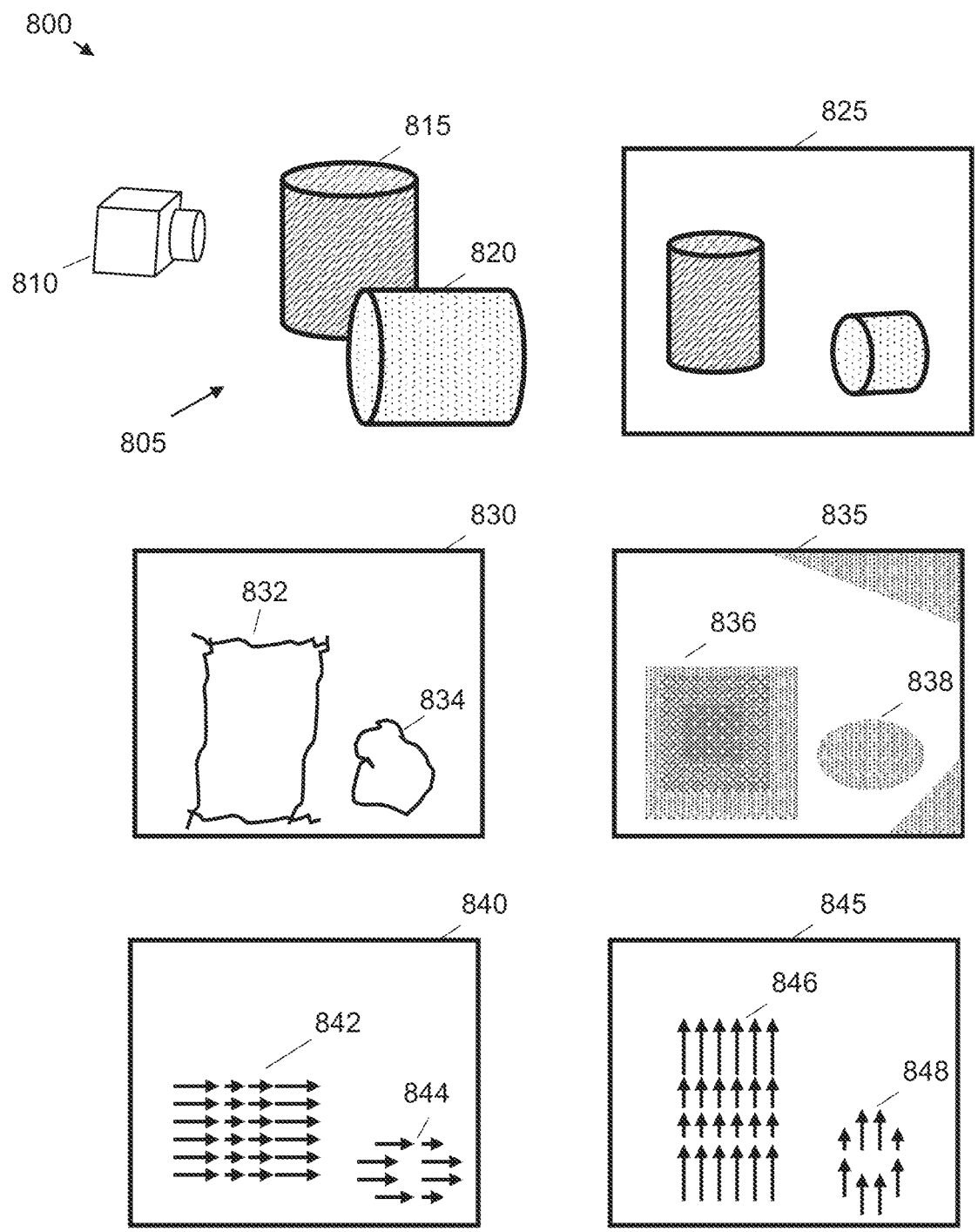
FIG. 8 is a schematic diagram showing an example of various features described with reference to FIGS. 1 to 7.

FIG. 8 is a schematic diagram showing an example 800 of various features described with reference to FIGS. 1 to 7. FIG. 8 illustrates an example of a three-dimensional (3D) environment 805, which may be referred to as a scene. The 3D environment 805 includes a capture device 810, such as the capture device 120 of FIG. 1, as well as two objects 815, 820. The capture device 810 is arranged to capture observations (for example in the form of still images, or video) of the 3D environment 805. These observations for example include observations of the objects 815, 820 and may show the position of the objects 815, 820 relative to each other and relative to other objects or features of the 3D environment (such as a surface supporting the objects 815, 820 or a wall behind the objects 815, 820). An example of a frame of video 825 showing an observation of the 3D environment 805 as captured by the capture device 810 is also shown in FIG. 8. As can be seen, the two objects 815, 820 are visible in the frame of video 825.

FIG. 8 also illustrates schematically an example of a first depth estimate 830 as obtained by a geometric reconstruction engine. As can be seen, the presence of the objects 815, 820 in the scene are indicated in the first depth estimate 830 by the outlines 832, 834. Hence, the first depth estimate 830 for example allows boundaries or other edges in an image (e.g. corresponding to a sudden change in depth, as may occur at an edge of an object in a scene) to be identified.

A second depth estimate 835 as obtained by a neural network architecture is also shown schematically in FIG. 8. As can be seen, the presence of the objects 815, 820 in the scene are indicated in the second depth estimate 835 by shading 836, 838. A greyscale value of the shading for example indicates a relative depth of a portion of an object.

In the example of FIG. 8, the two objects 815, 820 protrude towards the capture device 810. For example, the first object 815 is a cylinder, with a longitudinal axis which extends vertically in FIG. 8. Hence, the first object 815 bulges towards the capture device 810 at its centre, and recedes from the capture device 810 at its sides (as viewed from the capture device 810). The shape of the first object 815 is captured in the second depth estimate 835, which indicates a decrease in depth of the first object 815 relative to the capture device 810 towards the centre of the first object 815 (as indicated by a darker region of the shading 836 towards the centre of the first object in the second depth estimate 835). Edges of the first object are, however, sharper or more distinct in the first depth estimate 830 than in the second depth estimate 835. This illustrates that the first depth estimate 830 may more accurately capture depth in higher texture regions of a scene, whereas the second depth estimate 835 may more accurately capture depth in lower texture (i.e. smooth) regions of the scene. This can be further seen from the second depth estimate 835, which includes shading at upper and lower left corners, indicating that there is a difference in a depth of these regions compared with other regions of the scene. This difference is not identified by the first depth estimate 830, as it is a relatively subtle or small change in depth.

FIG. 8 also shows schematically an example of a first depth gradient estimate 840 in a first direction (in this example, the horizontal direction), and a second depth gradient estimate 845 in a direction orthogonal to the first direction (in this example, the vertical direction). The presence of the objects 815, 820 is indicated in the first depth gradient estimate 840 with the arrows 842, 844 respectively. The presence of the objects 815, 820 is indicated in the second depth gradient estimate 845 with the arrows 846, 848 respectively. As explained with reference to the first and second depth estimates 830, 835, the object 815 bulges towards the capture device 810 along its longitudinal axis. This can be seen in the first depth gradient estimate 840, in which the arrows 842 are closer together (indicating a less rapid change in depth gradient) in a central region than towards the sides of the object 815, where the object 815 curves more rapidly away from the capture device 810, due to its cylindrical shape.

Figure 9:
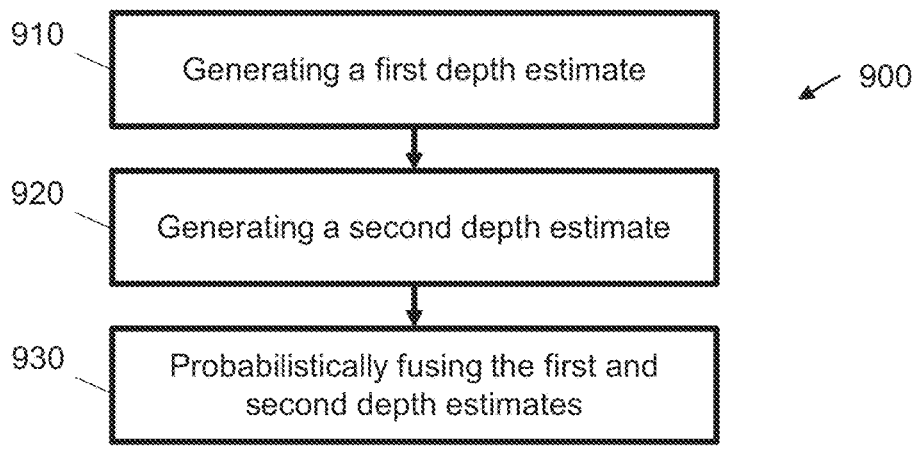
FIG. 9 is a flow diagram showing an example method of estimating depth for a scene.

FIG. 9 is a flow diagram showing an example method 900 of estimating depth for a scene. The method 900 comprises a first operation 910 of generating a first depth estimate. The first depth estimate may be generated using a geometric reconstruction of the scene, which is configured to output a measure of uncertainty for the first depth estimate. In a second operation 920, a second depth estimate is generated using a neural network architecture. The neural network architecture is configured to output a measure of uncertainty for the second depth estimate. In a third operation 930, the first depth estimate and the second depth estimate are probabilistically fused, using the measures of uncertainty, to generate a fused depth estimate for the scene. Any of the systems described herein may be used to implement the method 900 of FIG. 9.

Figure 10:
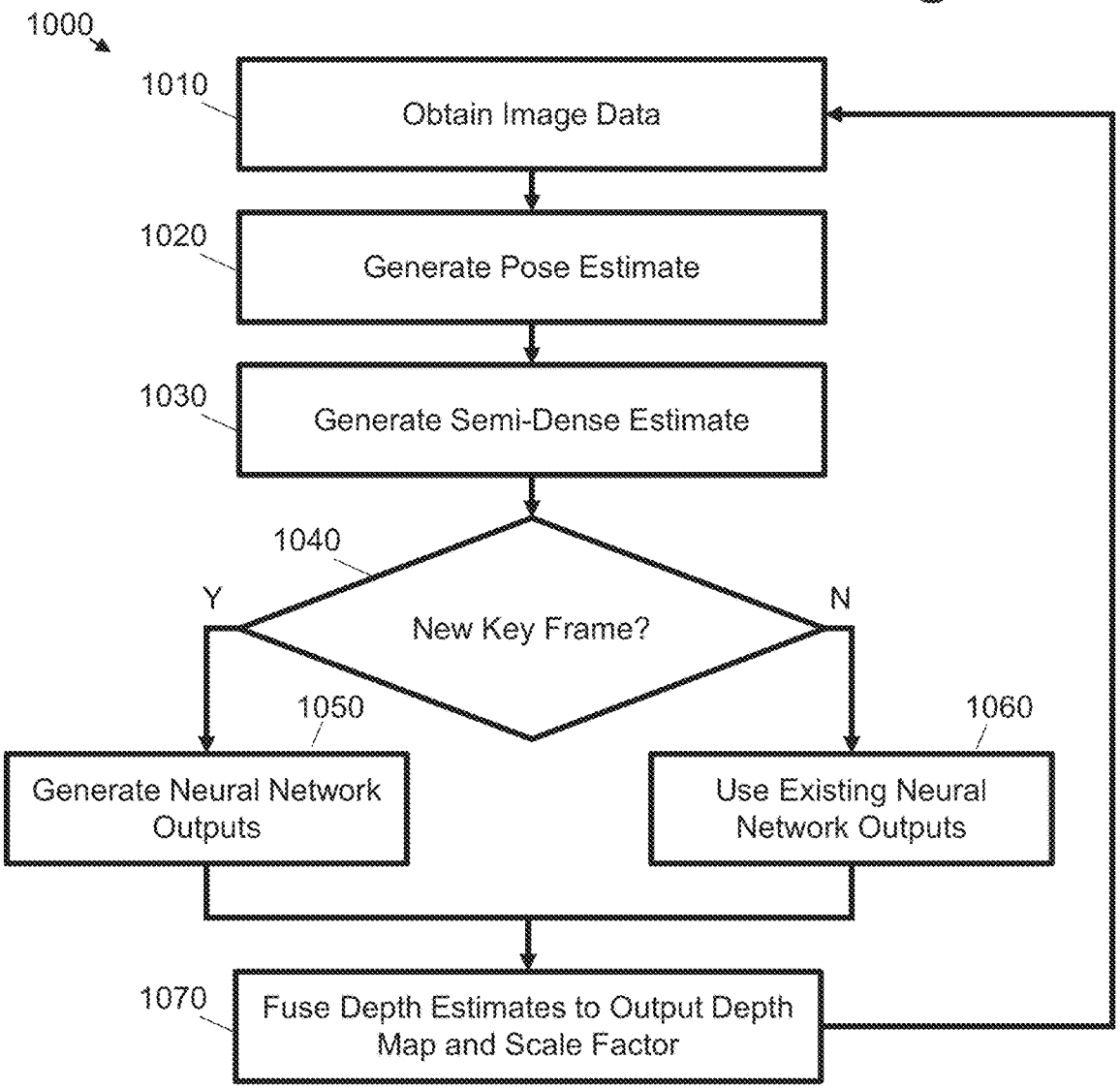
FIG. 10 is a flow diagram showing a further example method of estimating depth for a scene.

FIG. 10 is a flow diagram showing a further example method 1000 of estimating depth for a scene. In a first operation 1010, image data is obtained. The image data may be obtained from a capture device arranged to capture images of the scene. In a second operation 1020, a pose estimate for the capture device, during obtaining the image data of the first operation 1010, is generated. In a third operation 1030, a semi-dense estimate of a depth of the scene is obtained, for example using a geometric reconstruction engine as described with reference to other examples herein. In a fourth operation 1040, it is determined whether the image captured by the capture device is a key frame, as explained with reference to FIG. 6. If so, neural network outputs are generated in a fifth operation 1050, so as to generate a second depth estimate. If the image does not correspond to a key frame, though, existing neural network outputs (e.g. obtained for a previous image) are used instead at operation 1060. The neural network outputs for example include a second depth estimate, at least one surface orientation estimate and a measurement of uncertainty associated with each of the second depth estimate and the at least one surface orientation estimate, respectively. Finally, at a seventh operation 1070, the first depth estimate of the third operation 1030 and the second depth estimate of either the fifth or sixth operations 1050, 1060 are fused in a probabilistic manner, which for example uses measurements of uncertainty associated with the first and second depth estimates, respectively. In this example, at least one surface orientation estimate and the correspond measurements of uncertainty are also used during the fusion operation, so as to obtain a fused depth map and a scale factor. The method 100 of FIG. 10 may for example be implemented using the system 600 of FIG. 6.

Figure 11:
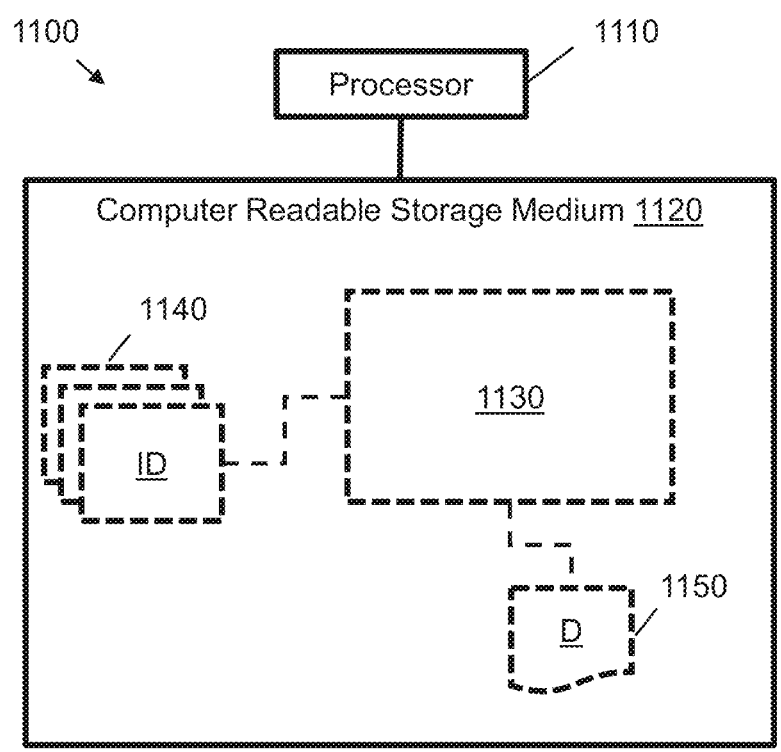
FIG. 11 is a schematic diagram showing an example of a processor and a non-transitory computer-readable storage medium comprising computer-executable instructions.

FIG. 11 is a schematic diagram showing an example 1100 of a processor 1110 and a non-transitory computer-readable storage medium 1120 comprising computer-executable instructions 1130. The computer-executable instructions 1130, when executed by the processor 1110, cause a computing device, such as a computing device comprising the processor 1110, to estimate depth for a scene. The instructions may result in a method being performed that is similar to the example methods described above. For example, the computer-readable storage medium 1120 may be arranged to store a plurality of first depth data 1140, which may be obtained for a plurality of reference frames as described with reference to FIG. 6. The computer-readable storage medium 1120 may also be arranged to store second depth data 1150 for a keyframe. The first depth data and the second depth data may be probabilistically fused to obtain a fused depth estimate. Although in FIG. 11, the first and second depth data 1140, 1150 are shown as being stored on the computer-readable storage medium 1120, in other examples, at least one of the first and second depth data 1140, 1150 may be stored in storage which is external to (but accessible by) the computer-readable storage medium 1120.

Figure 12:
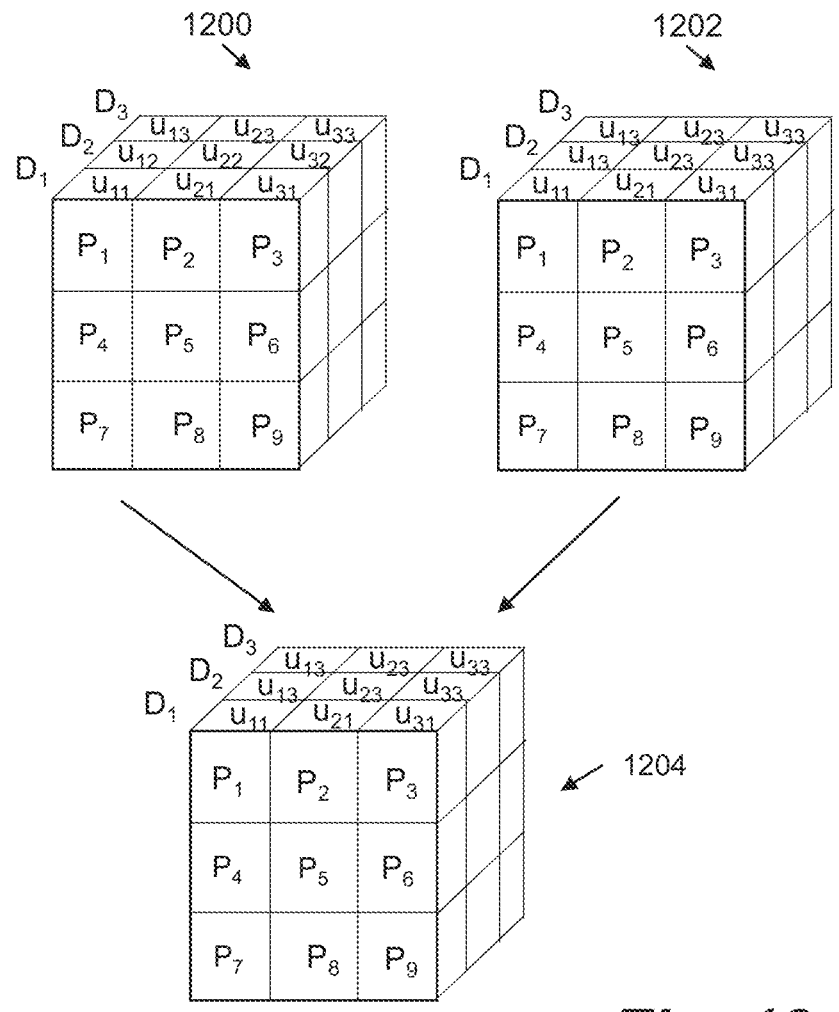
FIG. 12 is a schematic diagram showing fusion of a first and second depth estimate for a scene according to a further example.

FIG. 12 is a schematic diagram showing fusion of a first and second depth estimate for a scene according to a further example. In FIG. 12, a first depth probability volume 1200 is generated for a scene using geometric reconstruction. The first depth probability volume 1200 includes a first plurality of depth estimates (which in this case includes the first depth estimate discussed in other examples herein) and a first plurality of measures of uncertainty, each associated with a respective depth estimate of the first plurality of depth estimates. The first plurality of measures of uncertainty therefore includes the measure of uncertainty for the first depth estimate.

The first depth probability volume 1200 is shown schematically in FIG. 12, which is a simplified example for ease of illustration. In FIG. 12, a frame representing an observation of the scene includes 9 pixels, labelled in FIG. 12 as $P_1$ to $P_9$. Each of the pixels corresponds to an observation of a different respective portion of the scene. For each of the pixels in FIG. 12, there are 3 depth estimates (although other examples may have more or fewer depth estimates per pixel), labelled as $D_1$, $D_2$ and $D_3$. Each depth estimate of FIG. 12 is associated with a respective measure of uncertainty. The measure of uncertainty associated with an mth depth estimate, $D_m$, for an nth pixel, $P_n$, is labelled as $u_{nm}$ in FIG. 12. The measures of uncertainty are shown for the upper row of pixels ($P_1$, $P_2$ and $P_3$) in FIG. 12. However, it is to be appreciated that the depth estimates for the other pixels of the frame ($P_4$ to $P_9$) also have a corresponding measure of uncertainty (not shown in FIG. 12). The three-dimensional arrangement of the measures of uncertainty associated with respective depth estimates for a two-dimensional pixel array forms a three-dimensional probability volume in this example.

In FIG. 12, the measure of uncertainty associated with a given depth estimate of the first plurality of depth estimates of the first depth probability volume 1200 represents a probability that a given region of the scene (an observation of which is captured in a given pixel) is at a depth represented by the given depth estimate of the first plurality of depth estimates. Hence, in FIG. 12, $u_{11}$ represents the probability that the region of the scene captured in the first pixel $P_1$ is at a depth corresponding to that of the first depth estimate, $D_1$.

FIG. 12 also includes a second depth probability volume 1202, which is generated for the scene using a neural network architecture. The second depth probability volume 1202 in this case is otherwise similar to the first depth probability volume 1200 and includes a second plurality of depth estimates, comprising the second depth estimate, and a second plurality of measures of uncertainty, each associated with a respective depth estimate of the second plurality of depth estimates. The second plurality of measures of uncertainty therefore includes the measure of uncertainty for the second depth estimate. As for the first depth probability volume 1200, a measure of uncertainty associated with a given depth estimate of the second plurality of depth estimates represents a probability that a given region of the scene is at a depth represented by the given depth estimate of the second plurality of depth estimates.

In the example of FIG. 12, the first and second depth probability volumes 1200, 1202 include measures of uncertainty associated with the same respective depth estimates ($D_1$, $D_2$ and $D_3$) for a given pixel. It is to be appreciated, however, that in other examples the depth estimates for the first and second depth probability volumes 1200, 1202 may differ from each other. For example, one of the first and second depth probability volumes 1200, 1202 may comprise a greater number of depth estimates than the other and/or depth estimates of different values than each other.

It is to be appreciated that a measure of uncertainty associated with a given depth estimate typically differs between the first and second depth probability volumes 1200, 1202, as the accuracy of the geometric reconstruction and the neural network architecture generally differs for a given portion of the scene. This can lead to different probability distributions for the given portion of the scene depending on whether geometric reconstruction or the neural network architecture is used. For example, if a given technique (either geometric reconstruction or involving use of the neural network architecture) is unable to accurately characterise the depth of a given portion of the scene, a depth probability distribution associated with a pixel representing the given portion of the scene may be relatively flat, making it difficult to ascertain the most likely depth for that portion of the scene. Conversely, if a given technique is able to accurately determine the depth of the given portion of the scene, the depth probability distribution may have a sharper peak at a depth estimate corresponding to the depth of the given portion of the scene.

By fusing the measurements of uncertainty associated with the first and second depth probability volumes 1200, 1202, the depth estimates associated with the first and second depth probability volumes 1200, 1202 can themselves be probabilistically fused, thereby generating a fused depth probability volume 1204. This is shown schematically in FIG. 12, in which the fused depth probability volume 1204 is similar to the first and second depth probability volumes 1200, 1202 but typically includes different values for the measures of uncertainty $u_{nm}$ than those of the first and second depth probability volumes 1200, 1202, due to the probabilistic fusion of the depth estimates from the first and second depth probability volumes 1200, 1202. Probabilistically fusing the first and second depth probability volumes 1200, 1202 in this way allows information regarding the depth of the scene to be combined from two different sources (the geometric reconstruction and the neural network architecture), which typically improves the accuracy of the depth estimation compared to using each source individually.

Figure 13:
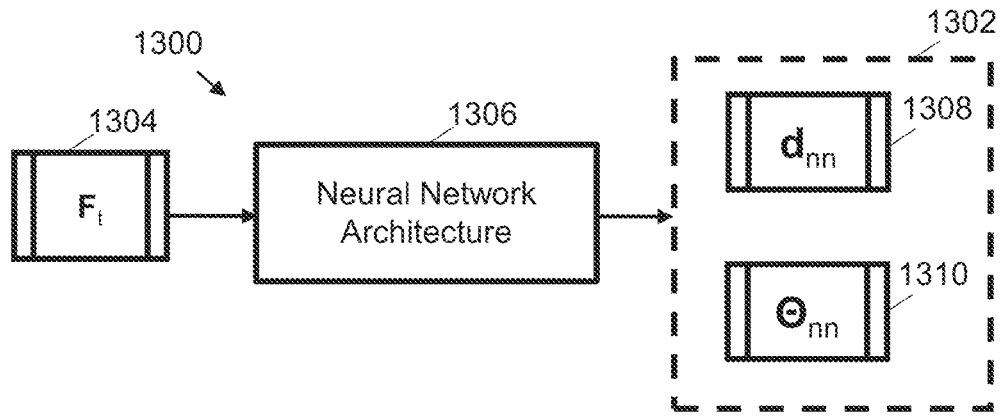
FIG. 13 is a schematic diagram of a system for obtaining a second depth probability volume according to an example.

FIG. 13 is schematic diagram of an example system 1300 for obtaining a second depth probability volume 1302, which may be similar to or the same as the second depth probability volume 1202 of FIG. 12. The system 1300 is arranged to receive a frame 1304 representing an observation of the scene. The frame 1304 in this case is represented by image data representative of an image of the scene. A neural network architecture 1306 of the system 1300 is configured to process the frame 1304 to generate the second depth probability volume 1302, which in this case includes a second plurality of depth estimates 1308 and a second plurality of measures of uncertainty 1310 (which in this case represent respective probabilities that a given region of the scene is at a depth represented by a depth estimate of the second plurality of depth estimates 1308).

The system 1300 of FIG. 13 is arranged to output a second plurality of depth estimates 1308 including a plurality of sets of depth estimates, each associated with a different respective portion of the image of the scene. Hence, if the system 1300 is used to output the second depth probability volume 1202 of FIG. 12, the depth estimates $D_1$, $D_2$ and $D_3$ for a given pixel may be considered to correspond to a set of depth estimates. Thus, an image comprising a plurality of pixels may be processed using the system 1300 of FIG. 13 to generate a plurality of sets of depth estimates, each associated with a different respective pixel of the plurality of pixels.

The neural network architecture 1306 in the example of FIG. 13 is configured to output measures of uncertainty 1310 associated with respective depth estimates 1308 having predefined values. In other words, rather than outputting a single depth value for each pixel, the neural network architecture 1306 of FIG. 13 is arranged to output a measure of uncertainty 1310 for each of a plurality of discrete, predefined, depth estimates 1308 for each pixel. In this way, the neural network architecture 1306 outputs, for a given pixel, a discrete depth probability distribution over a given range, which in this case is non-parametric. This allows the neural network architecture 1306 to express uncertainty about the predicted depth (as represented by the measure of uncertainty associated with a given depth estimate, which in this case is a probability value). It further allows the neural network architecture 1306 to make a multi-hypothesis depth prediction, which, when fused with the depth estimates obtained by the geometric reconstruction, allows the depth of the scene to be more accurately estimated.

The predefined values output by the neural network architecture 1306 may have a non-uniform spacing therebetween. With such an approach, the neural network architecture 1306 is arranged to output, for a given pixel, a depth probability distribution with a variable resolution over a depth range occupied by the depth estimates. For example, the predefined values may include a plurality of log-depth values within a predefined depth range (which may be all or part of the depth range occupied by the depth estimates). Using a log-depth parameterisation allows the depth range to be uniformly divided in log-space. This provides a higher depth resolution for regions closer to a capture device used to capture an observation of the scene, and a lower resolution for more distant regions.

Figure 14:
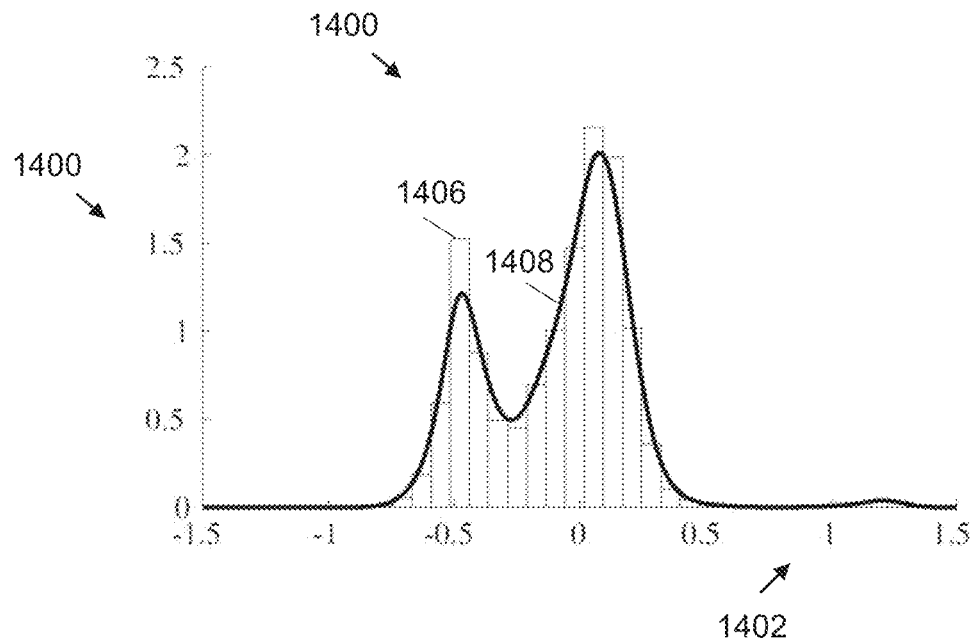
FIG. 14 is a schematic diagram showing an example of measures of uncertainty associated with respective depth estimates obtained using the system of FIG. 13.

The measures of uncertainty 1310 associated with respective depth estimates of the second plurality of depth estimates 1308 are shown schematically in FIG. 14 for a given pixel of an image as processed using the system 1300 of FIG. 13. In FIG. 14, the measures of uncertainty are probability density values, as indicated on a y-axis 1400 and the depth estimates are log-depth values in metres, as indicated on an x-axis 1402. The depth estimates in FIG. 14 have discrete values. FIG. 14 therefore illustrates a discrete probability distribution 1400 in the form of a bar chart 1406.

In some cases, a continuous probability function may be obtained from the discrete probability distribution 1400 to reduce discretization errors and to facilitate obtaining a depth estimate for the scene. A continuous probability function 1408 obtained from the discrete probability distribution 1400 is shown schematically in FIG. 14. The continuous probability function 1408 may be a smooth function, and is discussed further below with reference to FIG. 16.

Referring back to FIG. 13, various different neural network architectures may be used as the neural network architecture 1306. In one example, the neural network architecture 1306 includes a residual neural network (ResNet) encoder, followed by three upsample blocks, each including a bilinear upsampling layer, a concatenation with the input image, and then two convolutional layers so that the output has the same resolution as that of the input image representing an observation of the scene.

To train the neural network architecture 1306 of FIG. 13 to predict probability values associated with discrete depth estimates, an ordinal loss function may be used. An example of a suitable ordinal loss function, $\mathcal{L}(\theta)$, is as follows:

$$\mathcal{L}(\theta) = -\sum_i \left[ \sum_{k=0}^{k_i^*} \log(p_{\theta,i}(k_i^* \geq k)) + \sum_{k=k_i^*+1}^{K-1} \log(1 - p_{\theta,i}(k_i^* \geq k)) \right]$$

where:

$$p_{\theta,i}(k_i^* \geq k) = \sum_{j=k}^{K-1} p_{\theta,i}(k_i^* = j)$$

and where $\theta$ is the set of weights of the neural network architecture 1306, K is the number of bins over which the depth range is discretized, $k_i^*$ is the index of the bin containing the ground truth depth for pixel i, and $p_{\theta,i}(k_i^*=j)$ is the prediction of the neural network architecture 1306 of the probability that the ground truth depth is in bin j. However, this is merely an example, and other loss functions may be used in other examples.

Figure 15:
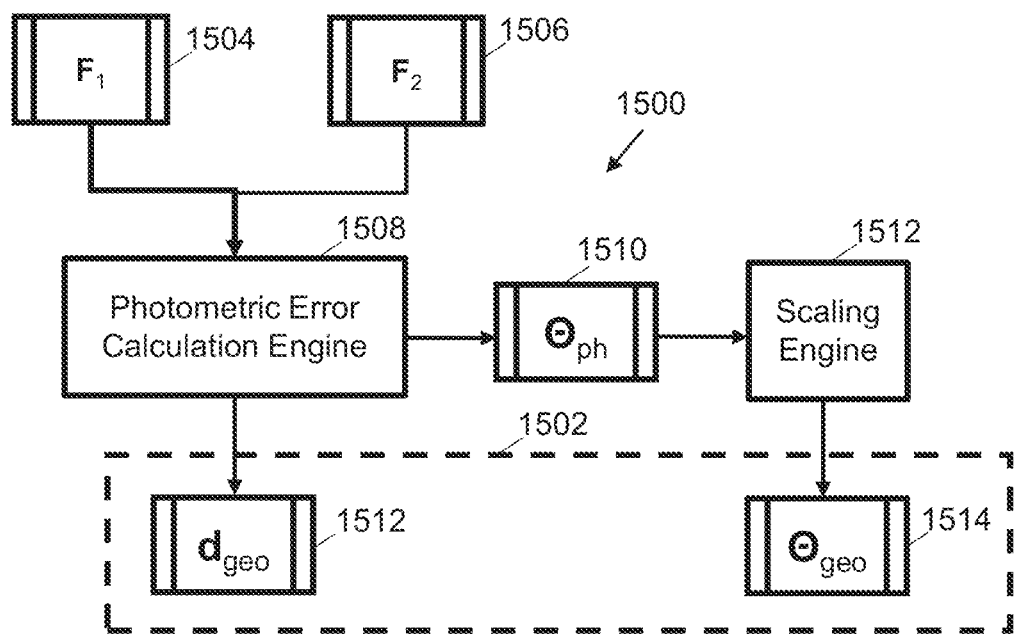
FIG. 15 is a schematic diagram of a system for obtaining a first depth probability volume according to an example.

Turning to FIG. 15, FIG. 15 is schematic diagram of an example system 1500 for obtaining a first depth probability volume 1502, which may be similar to or the same as the first depth probability volume 1200 of FIG. 12. The system 1500 of FIG. 15 is arranged to process a first frame 1504 representing a first observation of a scene and a second frame 1506 representing a second observation of a scene, e.g. prior to or after the first observation of the scene. The first and second observations in examples are last partially overlapping (e.g. so that both include observations of the same portion of a scene).

The first and second frames 1504, 1506 are processed by a photometric error calculation engine 1508 to generate, for each of a plurality of portions of the first frame 1504, a set of photometric errors 1510, each associated with a different respective depth estimate of a first plurality of depth estimates 1512. The photometric error may be obtained by warping the first frame 1504 into the second frame 1506 for each of the first plurality of depth estimates 1512 and determining a difference between the warped first frame 1504 and the second frame 1506. The difference in some cases is a sum of a squared difference between the pixel values of the warped first frame 1504 and the second frame 1506 for patches of pixels, e.g. of 3 by 3 pixels in size, although this is merely an illustrative example. Warping of the first frame 1504 in this way may be considered to correspond to mapping pixels of the first frame 1504 to corresponding positions in the second frame 1506, e.g. as described with reference to FIG. 2. For example, the photometric errors that are iteratively calculated for respective depth estimates in order to determine the depth value that minimizes the photometric error in the example described with reference to FIG. 2 may be output as the set of photometric errors 1510 by the photometric error calculation engine 1508 in the example of FIG. 15. The example of FIG. 2 involves calculating a measure of uncertainty, e.g. computed using a Jacobian term, associated with a depth estimate obtained by minimizing a photometric error. In contrast, in the example of FIG. 15, the set of photometric errors 1510 are themselves taken as respective measures of uncertainty, each associated with a respective depth estimate.

The warping of the first frame 1504 aims to replicate the second observation of the scene as captured in the second frame 1506 (e.g. as observed with a camera with a pose which is the same as a second pose of the camera during capture of the second frame 1506). The first frame 1504 is transformed in this way for each of the first plurality of depth estimates 1512 (where each of the depth estimates is a hypothesized depth of the scene with respect to a first pose of the camera during capture of the first frame 1504). Although typically the depth of the scene is non-uniform with respect to the first pose, the warping may be performed more efficiently by assuming that the entirety of the scene is at the same depth, and then calculating the photometric errors for that depth estimate on a per-pixel (or per-image-patch basis). This approach can be performed repeatedly for the first plurality of depth estimates 1512 for each of a plurality of pixels of the first frame 1504 to generate a cost volume, from which the first depth probability volume 1502 can be obtained. It is to be appreciated that the first and second poses of the camera may be obtained using any suitable method, as explained with reference to FIG. 2.

To simplify fusion of the first depth probability volume 1502 with a second depth probability volume obtained using the system 1300 of FIG. 13, the midpoint of each of the depth bins for which a probability value is output by the neural network architecture 1306 may be used as respective depth estimates of the first depth probability volume 1502. This need not be the case in other examples, though.

In some examples, the first and second frames 1504, 1506 are normalised before the first frame 1504 is warped and/or before the set of photometric errors 1510 is calculated. Normalisation may be performed by subtracting, for each of the first and second frames 1504, 1506 respectively, the mean pixel value from each of the pixel values, and dividing each of the outputted values by the standard deviation of the first and second frames 1504, 1506, respectively. This allows the underlying photometric difference between the warped first frame 1504 and the second frame 1506 for a given depth estimate to be more accurately determined, without being unduly affected by changes in illumination between the first and second observations of the scene.

As discussed above, the set of photometric errors 1510 obtained by the photometric error calculation engine 1508 of FIG. 15 may be considered to form a cost volume. To obtain the first depth probability volume 1502 from the set of photometric errors 1510, the system 1500 of FIG. 15 includes a scaling engine 1512 which is configured to scale the photometric errors 1510 to respective probability values 1514 (which may be considered to correspond to measures of uncertainty associated with depth estimates of the first plurality of depth estimates 1512). In one case, the scaling includes separately scaling the negative of the squared photometric error for each pixel such that, after scaling, the negative of the squared photometric error for each of the first plurality of depth estimates 1512 for a given pixel sums to one. The scaled values may then be taken as respective probability values 1514 associated with a given depth estimate of the first plurality of depth estimates 1512, thereby generating the first probability volume 1502.

Figure 16:
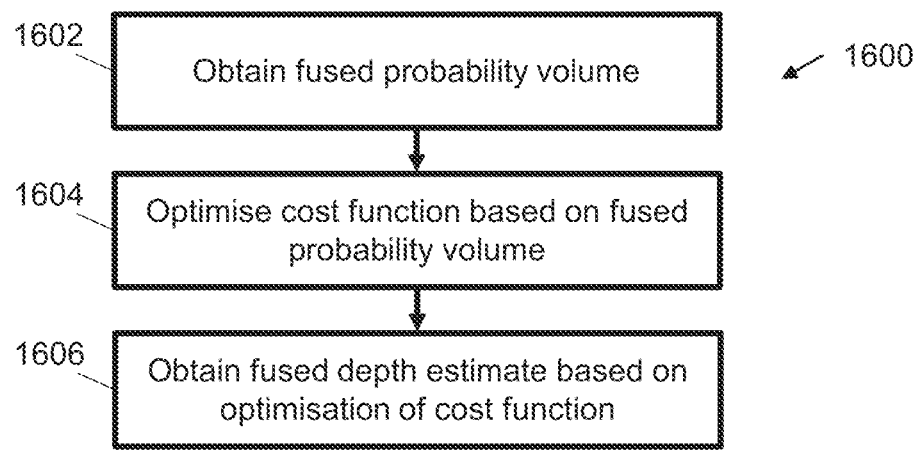
FIG. 16 is a flow diagram showing an example method of obtaining a fused depth estimate for a scene.

FIG. 16 is a flow diagram showing an example method 1600 of obtaining a fused depth estimate for a scene, an observation of which is captured in a plurality of frames, each comprising an array of pixels. The fused depth estimate is obtained using first and second depth probability volumes such as those described with reference to FIGS. 12 to 15.

Item 1602 of FIG. 16 involves obtaining a fused probability volume. At item 1602, the first and second depth estimates (which form part of the first and second depth probability volumes respectively) are probabilistically fused by combining the first and second plurality of measures of uncertainty to generate the fused probability volume. The first and second plurality of measures of uncertainty may be combined in various different ways. In one case, in which the first and second plurality of measures of uncertainty are probability values associated with the first and second depth probability volumes, the fused probability volume is obtained by combining (e.g. by multiplying) the probability value associated with a depth estimate of the first plurality of depth estimates with a probability value associated with a corresponding depth estimate of the second plurality of depth estimates to obtain a fused value for each of the depth estimates. In some cases, the fused values for each of the depth estimates for a given pixel are then scaled to sum to one, to generate a fused probability value for each of the depth estimates. This may be omitted in other cases, though, e.g. if the probability values associated with the first and second plurality of depth estimates have already previously been scaled to sum to one for a given pixel.

In the example of FIG. 16, to avoid quantisation of a depth estimate of the scene obtained using the fused probability volume and to obtain a suitable function for use in a subsequent optimisation step (discussed further with reference to items 1604 and 1606 of FIG. 16), a depth probability function is obtained using the fused probability volume. The depth probability function represents a parameterisation of the fused probability volume, allowing continuous depth values to be obtained (rather than merely the discrete depth estimates of the fused probability volume). The depth probability function may be obtained using any suitable technique for parameterising a discrete distribution, such as a kernel density estimation (KDE) technique, e.g. with Gaussian basis functions.

At items 1604 and 1606 of FIG. 16, a fused depth estimate for the scene is obtained from the fused probability volume (in this case, from the depth probability function obtained from the fused probability volume, although this is merely an example). In the example of FIG. 16, obtaining the fused depth estimate for the scene includes optimising a cost function at item 1604. The cost function in this case includes a first cost term obtained using the fused probability volume and a second cost term including a local geometric constraint on depth values. The cost function, c(d), can be expressed as:

$$c(d) = c_1(d) + \lambda c_2(d)$$

where d are the depth values to be estimated, $c_1(d)$ is the first cost term, $c_2(d)$ is the second cost term, and $\lambda$ is a parameter used to adjust the contribution of the second cost term to the cost function. The parameter may be adjusted empirically to obtain an appropriate estimate of the depth values. A suitable value for the parameter $\lambda$ in one case is $1 \times 10^7$, although this is merely an example.

The first cost term depends on the fused probability volume, and in the example of FIG. 16 depends on the depth probability function obtained from the fused probability volume. In this case, the first cost term may be expressed as:

$$c_1(d) = -\sum_i \log(f_i(d_i))$$

where $f_i(d_i)$ is the output of the depth probability function for pixel i of a given input frame (representing an observation of a scene) evaluated at depth $d_i$.

By fusing the first and second depth probability volumes, the fused probability volume typically has greater local consistency than using geometric reconstruction or the neural network architecture alone. In the example of FIG. 16, the local consistency is improved by including the second cost term, which may be considered a regularisation term. The second cost term in this case imposes a local geometric constraint during the optimisation of the cost function, which provides for better preservation of local geometry.

Figure 17:
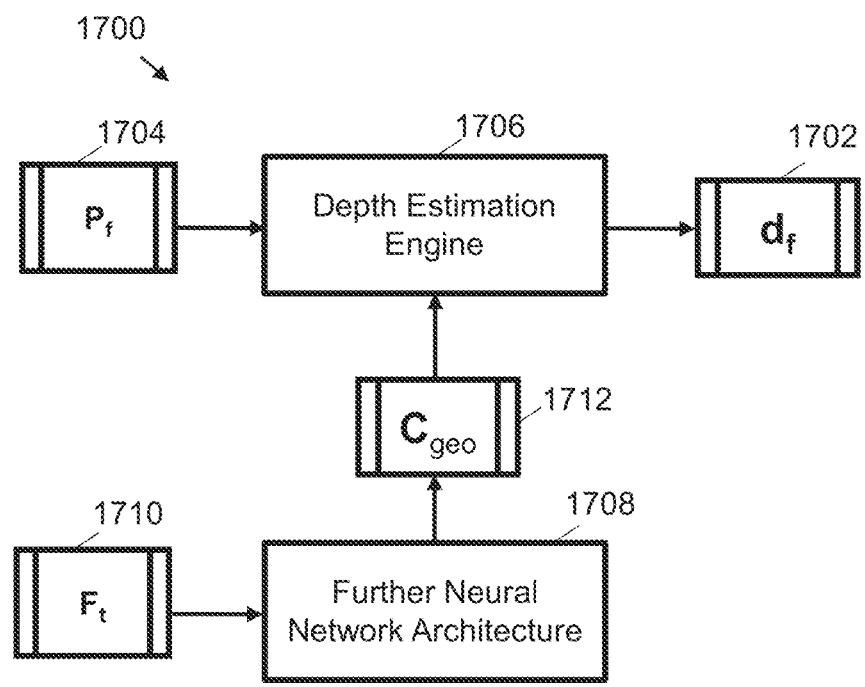
FIG. 17 is a schematic diagram of a system for obtaining a fused depth estimate according using the method of FIG. 16.

A system 1700 for obtaining the fused depth estimate 1702 using the method 1600 of FIG. 16 is shown schematically in FIG. 17. A fused depth probability volume 1704 is input to a depth estimation engine 1706 of the system 1700. The depth estimation engine 1706 performs the cost function optimisation of item 1604 of FIG. 16. The first cost term of the cost function depends on the fused depth probability volume 1704 input to the depth estimation engine 1706, and in this case may be expressed using the formula above for $c_1(d)$. Hence, in FIG. 17, the depth estimation engine 1706 is arranged to obtain the depth probability function from the fused depth probability volume 1704, in order to calculate the first cost term. In other cases, though, the first cost term may be obtained from the fused depth probability volume

1704 itself, or the depth estimation engine 1706 may be arranged to receive the depth probability function rather than the fused depth probability volume 1704.

The system 1700 of FIG. 17 also includes a further neural network architecture 1708, which is arranged to receive an input frame 1710 representing an observation of the scene for which the fused depth estimate is to be generated, and to generate geometric constraint data 1712 for use in generating the second cost term of the cost function. The input frame 1710 in this case is the input frame processed by a neural network architecture to generate the second depth probability volume and one of the frames processed by a geometric reconstruction engine to generate the first depth probability volume, although this is merely an example.

The geometric constraint data 1712 in the example of FIG. 17 represents a surface orientation estimate and an occlusion boundary estimate. The surface orientation estimate and the occlusion boundary estimate are used to generate the second cost term. The surface orientation estimate for example represents a surface normal for a given pixel of the input frame 1710, as predicted by the further neural network architecture 1708. Any suitably trained neural network architecture may be used as the further neural network architecture 1708, as the skilled person will appreciate. Use of the surface orientation estimate in the second cost term improves the preservation of local geometry in the fused depth estimate obtained by optimising the cost function. For example, the second cost term is generally smaller where the surface orientation estimates are similar for adjacent pixels (e.g. indicating that these pixels are at a similar orientation, as would be expected for a continuous, planar surface).

However, a scene typically includes depth discontinuities at object boundaries (which may be referred to as occlusion boundaries). At such boundaries, the surface orientation estimates for adjacent pixels of an input frame representing an observation of the scene are generally different from each. The surface orientation estimates may be unreliable in such regions, as part of the object in these regions may be occluded due to a sharp change in depth of the object at an object boundary. An observation of these parts of an object may therefore be absent from the input frame, which can affect the reliability of the surface orientation estimates and the reliability of a cost term based on differences between surface orientation estimates for neighbouring pixels of an image representing an observation of a scene.

To compensate for this, the second cost term in the example of FIG. 17 masks the regularisation term at occlusion boundaries. In other words, the second cost term is weighted by a value, such as a value between zero and one, to adjust the contribution of the second cost term for respective pixels of the input frame 1710, e.g. so that the contribution of the second cost term is lower for pixels corresponding to unreliable regions of the input frame 1710, such as those corresponding to occlusion boundaries, and higher for pixels corresponding to more reliable regions. For example, the second cost term may be weighted by a weight with a value of zero for pixels that lie on occlusion boundaries so the second cost term does not contribute to the optimisation of the cost function for these pixels.

In some cases, the further neural network architecture 1708 outputs the probability that a given pixel belongs to an occlusion boundary as the occlusion boundary estimate. In such cases, a pixel may be considered to lie on an occlusion boundary where this probability takes a value that equals or exceeds a predetermined threshold, such as 0.4.

In the example of FIG. 17, the second cost term, $c_2(d)$, generated by the depth estimation engine 1706 and used to optimise the cost function may be expressed as:

$$c_2(d) = \sum_i b_i (\langle \tilde{n}_i, d_i K^{-1} \tilde{u}_i - d_{i+1} K^{-1} \tilde{u}_{i+1} \rangle)^2 + b_i (\langle \tilde{n}_i, d_i K^{-1} \tilde{u}_i - d_{i+W} K^{-1} \tilde{u}_{i+W} \rangle)^2$$

where $b_i \in \{0,1\}$ is the value of the mask based on the occlusion boundary estimate for pixel i of the input frame 1710, $\langle . , . \rangle$ represents the dot product operator, $\tilde{n}_i$ is the surface orientation estimate output by the further neural network architecture 1708, K is a matrix representing intrinsic parameters associated with a camera used to capture the input frame 1710 (sometimes referred to as a camera intrinsics matrix), $\tilde{u}_i$ represents the homogeneous pixel coordinates for pixel i and W is the width of the image in pixels.

In FIG. 17, the cost function is optimised by the depth estimation engine 1706 using gradient descent, to obtain the fused depth estimate 1702 corresponding to the depth values d that minimise a value of the cost function (item 1606 of FIG. 16). This is merely an example, though, and in other cases the fused depth estimate may be obtained using a different optimisation technique.

Figure 18:
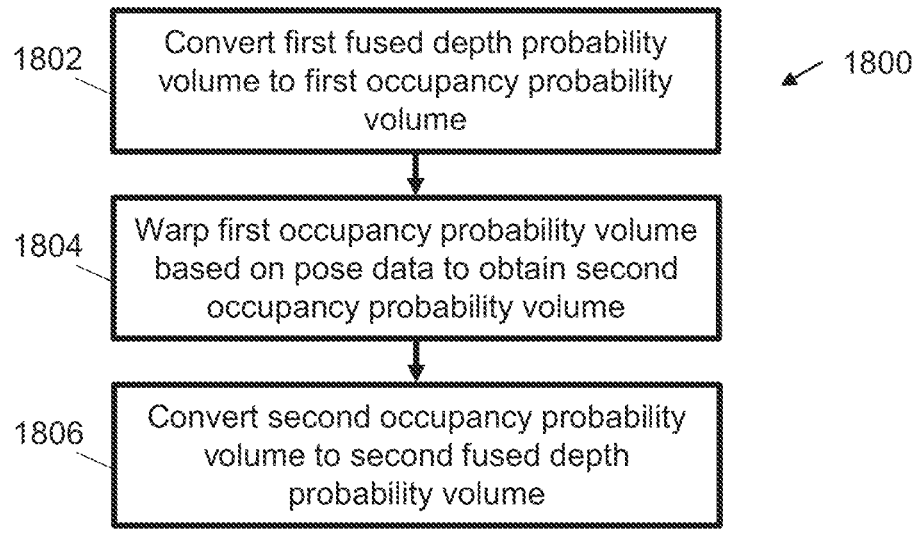
FIG. 18 is a flow diagram showing an example method of obtaining a second fused depth probability volume.

FIG. 18 is a flow diagram showing an example method 1800 of obtaining a second fused depth probability volume. The method 1800 of FIG. 18 may be used to obtain a second fused depth probability volume associated with a second frame of video data representing a second observation of a scene from a first fused depth probability volume associated with a first frame of video, e.g. prior to or after the second frame, representing a first observation of the scene. By using the first fused depth probability volume to obtain the second fused depth probability volume, information regarding the depth of the scene may be retained across a plurality of frames. This can improve a depth estimate for the second frame compared to recalculating this depth estimate without use of information from the first frame.

Propagating information represented by the first fused depth probability volume into the second frame is non-trivial as the first fused depth probability volume represents a depth probability distribution for respective pixels of the first frame. To address this, item 1802 of FIG. 18 involves converting the first fused depth probability volume to a first occupancy probability volume. The first fused depth probability volume for the first frame may be obtained using any of the methods described with reference to FIGS. 12 to 17. The first occupancy probability volume may be considered to be an occupancy-based probability volume such that, for each depth along a ray propagating from a camera with a first pose associated with capture of the first frame towards the scene, there is a probability that an associated point in space is occupied.

In one case, the first occupancy probability volume is obtained by first determining the probability that a voxel $S_{k,i}$ (which is for example a three-dimensional volume element corresponding to a depth estimate associated with bin k of the first depth probability volume along the ray associated with pixel i of the first frame) is occupied, conditioned on the depth belonging to bin j of the first depth probability volume:

$$p(S_{k,i} = 1 \mid k_i^* = j) = \begin{cases} 0 & \text{if } k < j \\ 1 & \text{if } k = j \\ \frac{1}{2} & \text{if } k > j \end{cases}$$

From this, the first occupancy probability volume, $p(S_{k,i}=1)$, can be obtained using:

$$p(S_{k,i} = 1) = \sum_{k=0}^{K-1} p_i(k_i^* = k) p(S_{k,i} = 1 \mid k_i^* = k)$$

where $p_i(k_i^*=k)$ is the probability value of bin k of the first depth probability volume for pixel i of the first frame, and K is the width of the first frame in pixels.

Item 1804 of FIG. 18 involves warping the first occupancy probability volume based on pose data representing poses of a camera during observation of the scene to obtain a second occupancy probability volume associated with the second frame. The warping of the first occupancy probability volume may be otherwise similar to the warping of the first frame to obtain the photometric errors 1510 as described with reference to FIG. 15, and typically uses first pose data representing a first pose of the camera during capture of the first frame and second pose data representing a second pose of the camera during capture of the second frame, as the pose data. In this way, the first occupancy probability volume can be warped into the second frame. In some cases, the second frame may include some pixels for which there is no corresponding warped first occupancy probability volume. For these pixels, a predetermined (e.g. a default) value may be used for the occupancy probability, such as a value of 0.01 (although this merely an example).

At item 1806 of FIG. 18, the second occupancy probability volume is converted to a second fused depth probability volume associated with the second frame. This conversion may be performed using the following formula to obtain the probability value of bin k for a second depth probability distribution for pixel i of the second frame $p_i(k_i^*=k)$:

$$p_i(k_i^* = k) = \prod_{j<k}[1 - p(S_{j,i} = 1)]p(S_{k,i} = 1)$$

This formula may be used to generate the probability values for respective bins of the second fused depth probability distribution for each of a plurality of pixels of the second frame. The second fused depth probability distribution may then be scaled such that the distribution sums to one along one ray, to obtain the second fused depth probability volume. A fused depth estimate for the second frame may then be obtained from the second fused depth probability volume, e.g. as described with reference to FIGS. 16 and 17.

Figure 19:
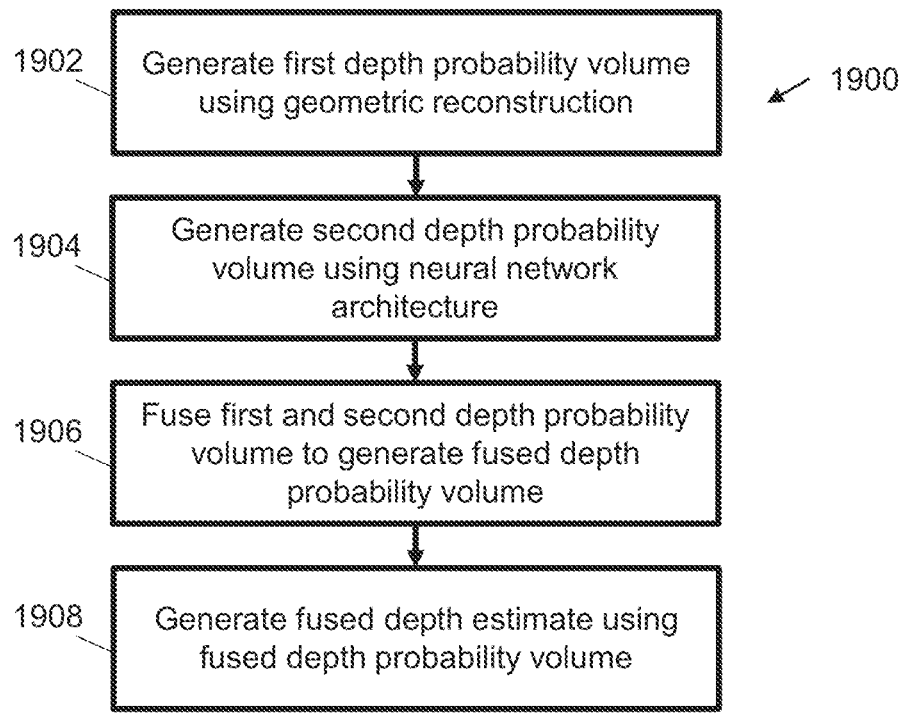
FIG. 19 is a flow diagram showing an example method of estimating depth for a scene according to a further example.

FIG. 19 is a flow diagram showing an example method 1900 of estimating depth for a scene according to a further example.

At item 1902, a first depth probability volume for a scene is generated using a geometric reconstruction of the scene. The first depth probability volume is for example the same as or similar to the first depth probability volume described with reference to FIG. 12, and may be generated for example as described with reference to FIG. 15.

At item 1904, a second depth probability volume for the scene is generated using a neural network architecture. The second depth probability volume is for example the same as or similar to the second depth probability volume described with reference to FIG. 12, and may be generated for example as described with reference to FIGS. 13 and 14.

At item 1906, the first depth probability volume and the second depth probability volume are used to generate a fused depth probability volume for the scene and at item 1908, a fused depth estimate for the scene is generated using the fused depth probability volume. The generation of the fused depth probability volume and the fused depth estimate of items 1906 and 1908 of FIG. 19 may use a method similar to or the same as the methods of FIGS. 16 and/or 17.

Figure 20:
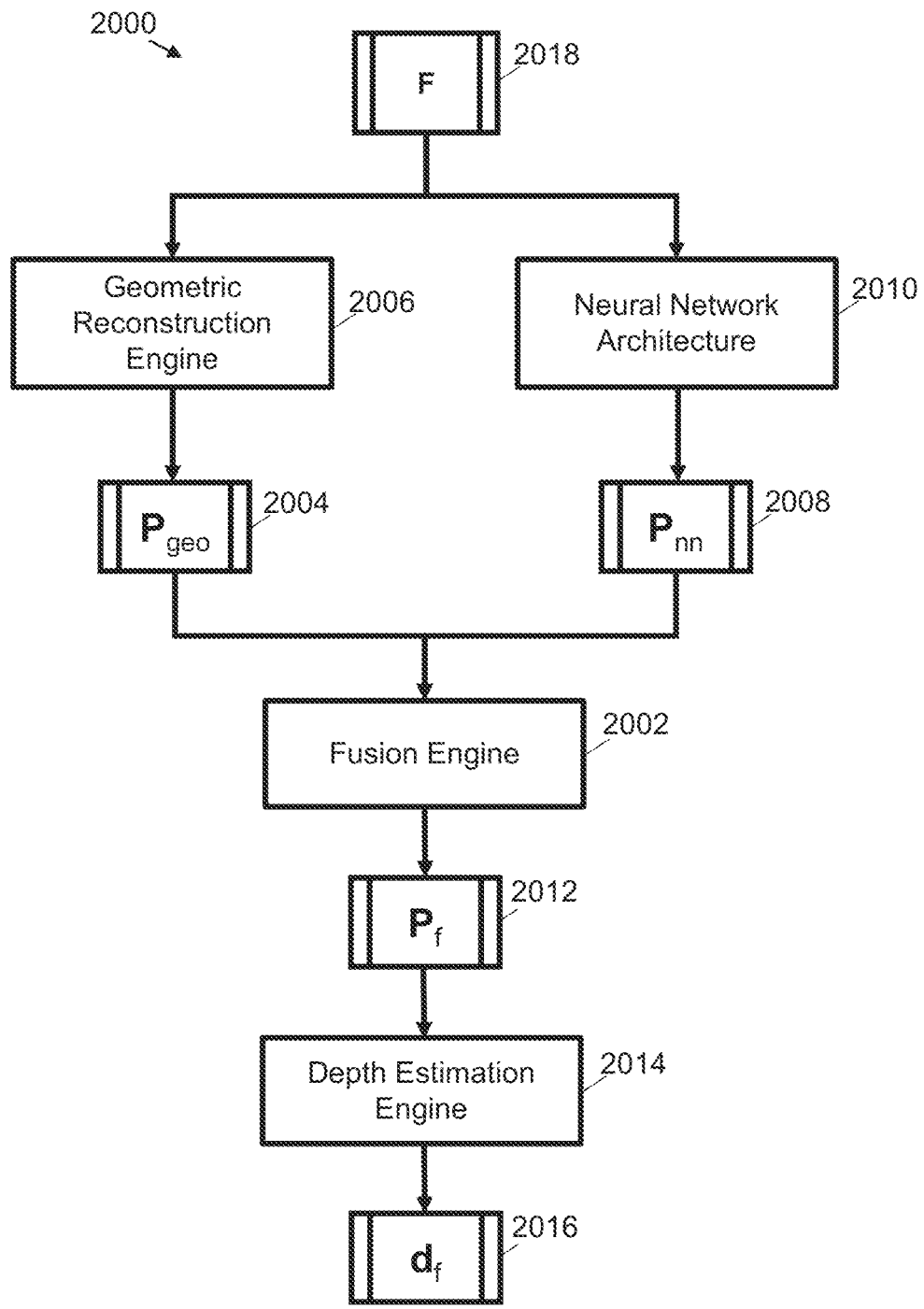
FIG. 20 is a schematic diagram of an image processing system to estimate depth for a scene according to a further example.

FIG. 20 is a schematic diagram of an image processing system 2000 to estimate depth for a scene according to a further example. The image processing system 2000 includes a fusion engine 2002 to receive a first depth probability volume 2004 from a geometric reconstruction engine 2006 and a second depth probability volume 2008 from a neural network architecture 2010, and to fuse the first depth probability volume 2004 and the second depth probability volume 2008 to output a fused depth probability volume 2012 for the scene. The image processing system 2000 also includes a depth estimation engine 2014 to use the fused depth probability volume 2012 to estimate the depth for the scene (which may be referred as a fused depth estimate 2016).

In the example of FIG. 20, the image processing system 2000 is arranged to process input frames 2018 representing respective observations of the scene to generate the fused depth estimate 2016. The input frames 2018 for example include a first frame, which is processed by the neural network architecture 2010 to generate the second depth probability volume 2008, e.g. as described with reference to FIGS. 12 to 14. The input frames 2018 may also include a second frame. In such examples, both the first and second frame may be processed by the geometric reconstruction engine 2006 to generate the first depth probability volume 2004, e.g. as described with reference to FIGS. 12 and 15. The generation of the fused depth probability volume 2012 by the fusion engine 2002 and the generation of the fused depth estimate 2016 by the depth estimation engine 2014 may be e.g. as described with reference to FIGS. 16 and 17.

The above examples are to be understood as illustrative. Further examples are envisaged.

In the example of FIG. 16, the cost function includes a first cost term and a second cost term. In other examples that are otherwise the same as or similar to the example of FIG. 16, the cost function may not include the second cost term, and may e.g. include solely the first cost term.

The fused depth probability volume obtained for a first frame by the method 1900 of FIG. 19 or the system 2000 of FIG. 20 may be warped as described with reference to FIG. 18 to obtain a depth probability volume for a second frame.

It is to be appreciated that the estimation of a depth of a scene as described with reference to FIGS. 12 to 17 and 19 and 20 need not be performed for each observation of a scene. Instead, the depth may be estimated for a subset of observations (e.g., a subset of frames), which may be referred to as keyframes. This can reduce processing requirements. Similarly, the method of FIG. 19 need not be performed for each frame subsequent to a keyframe for which depth is estimated. For example, the method of FIG. 19 may be omitted where the pose of the camera has changed significantly between the first and second frames.

For a first frame of a video for which depth is to be estimated, a neural network architecture such as those described above may be used to estimate the depth (e.g. by calculating the depth estimate from a second depth probability volume, without fusing the second depth probability volume with a first depth probability volume). After obtaining at least one further frame of the video, the first depth probability volume may be calculated and fused with the second depth probability volume to obtain a fused depth probability volume for generating a fused depth estimate for the scene.

In the example of FIGS. 16 and 17, the fused depth estimate is generated using a cost function based on a depth probability function derived from a fused depth probability volume. This approach tends to be more accurate in featureless regions where the predictions from the neural network architecture are relatively uncertain and hence susceptible to false minima. However, in other examples, the fused depth estimate for a given pixel may be taken as the depth estimate for the pixel from the fused depth probability volume that has the maximum probability.

In the examples of FIGS. 12 to 20, the fused depth estimates are dense depth estimates. However, in other cases, similar methods or systems may be used to obtain semi-dense or sparse depth estimates, e.g. by processing a subset of pixels of input frames using the methods herein. In addition or alternatively, there may be a one-to-one, one-to-many or many-to-one mapping between respective depth estimates of a fused depth estimate obtained in accordance with the examples of any one of FIGS. 12 to 20 and pixels of input frames for which the fused depth estimate is obtained.

The examples of FIGS. 12 to 20 are described with reference to processing frames representing observations of a scene. However, it is to be appreciated that these methods and/or systems may alternatively be used to process a still images rather than frames of a video.

The method 1900 of FIG. 19 and/or the system 2000 of FIG. 20 may use any of the systems or apparatus described herein, such as the capture devices of FIGS. 1A to 1C, the computing system 700 of FIG. 7A and/or the robotic device 760 of FIG. 7B. Instructions to perform the method 1900 of FIG. 19 or to implement the system 2000 of FIG. 20 may be stored on a non-transitory computer-readable storage medium, such as that described with reference to FIG. 11.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention, which is defined in the accompanying claims.

What is claimed is:

1. An image processing system to estimate depth for a scene captured in a first frame of video data, comprising:
a fusion engine to receive a first depth estimate from a geometric reconstruction engine and a second depth estimate for the first frame of video data from a neural network architecture, and to probabilistically fuse the first depth estimate and the second depth estimate to output a fused depth estimate for the scene,
wherein the fusion engine is configured to receive a measurement of uncertainty for the first depth estimate from the geometric reconstruction engine and a measurement of uncertainty for the second depth estimate from the neural network architecture,
wherein the fusion engine is configured to use the measurements of uncertainty to probabilistically fuse the first depth estimate and the second depth estimate,
wherein the first depth estimate comprises a plurality of first depth estimates for the first frame of video data, at least one of the plurality of first depth estimates being generated using a second frame of video data that differs from the first frame of video data, and
wherein the fusion engine is configured to iteratively output the fused depth estimate for the scene, at each iteration processing the second depth estimate and one of the plurality of depth estimates.

2. The system of claim 1, wherein the fusion engine is configured to receive a surface orientation estimate, and a measure of uncertainty for the surface orientation estimate, from the neural network architecture, and to use the surface orientation estimate, and the measure of uncertainty for the surface orientation estimate, to probabilistically fuse the first depth estimate and the second depth estimate.

3. The system of claim 2, wherein the surface orientation estimate comprises one or more of:
a depth gradient estimate in a first direction;
a depth gradient estimate in a direction orthogonal to the first direction; and
a surface normal estimate.

4. The system of claim 1, wherein the fusion engine is configured to determine a scale estimate when probabilistically fusing the first depth estimate and the second depth estimate.

5. The system of claim 1, wherein the first depth estimate, the second depth estimate and the fused depth estimate each comprise a depth map for a plurality of pixels.

6. The system of claim 1, wherein the first depth estimate is a semi-dense depth estimate, and the second depth estimate and the fused depth estimate each comprise a dense depth estimate.

7. The system of claim 1, comprising:
a monocular camera to capture frames of video data;
a tracking system to determine poses of the monocular camera during observation of the scene; and
the geometric reconstruction engine,
wherein the geometric reconstruction engine is configured to use the poses from the tracking system and the frames of video data to generate depth estimates for at least a subset of pixels from the frames of video data, the geometric reconstruction engine being configured to minimise a photometric error to generate the depth estimates.

8. The system of claim 1, comprising:
the neural network architecture,
wherein the neural network architecture comprises one or more neural networks and is configured to receive pixel values for frames of video data and predict:
a depth estimate for each of a first set of image portions to generate the second depth estimate;
at least one surface orientation estimate for each of a second set of image portions;
one or more uncertainty measures associated with each depth estimate; and
one or more uncertainty measures associated with each surface orientation estimate.

9. A method of estimating depth for a scene captured in a first frame of video data, comprising:
generating a first depth estimate for the scene using a geometric reconstruction of the scene, wherein the geometric reconstruction is configured to output a measure of uncertainty for the first depth estimate, wherein the first depth estimate comprises a plurality of first depth estimates for the first frame of video data, at least one of the plurality of first depth estimates being generated using a second frame of video data that differs from the first frame of video data;

generating a second depth estimate for the first frame of video data using a neural network architecture, wherein the neural network architecture is configured to output a measure of uncertainty for the second depth estimate;

probabilistically fusing the first depth estimate and the second depth estimate using the measures of uncertainty to generate a fused depth estimate for the scene; and iteratively outputting the fused depth estimate for the scene, at each iteration processing the second depth estimate and one of the plurality of depth estimates.

10. The method of claim 9, comprising, prior to generating the first depth estimate:
obtaining image data representative of two or more views of the scene from a camera, wherein generating the first depth estimate comprises:
obtaining a pose estimate for the camera; and
generating the first depth estimate by minimising a photometric error, the photometric error being a function of at least the pose estimate and the image data.

11. The method of claim 9, comprising, prior to generating the first depth estimate:
obtaining image data representative of one or more views of the scene from a camera,
wherein generating the second depth estimate comprises:
receiving, at the neural network architecture, the image data;
predicting, using the neural network architecture, a depth estimate for each of a set of image portions to generate the second depth estimate;
predicting, using the neural network architecture, at least one surface orientation estimate for each of the set of image portions; and
predicting, using the neural network architecture, a set of uncertainty measures for each depth estimate and for each surface orientation estimate.

12. The method of claim 11, wherein the surface orientation estimate comprises one or more of:
a depth gradient estimate in a first direction;
a depth gradient estimate in a direction orthogonal to the first direction; and
a surface normal estimate.

13. The method of claim 9, comprising, prior to generating the first depth estimate:
obtaining image data representative of two or more views of the scene from a camera, the image data comprising a plurality of pixels,
wherein generating the first depth estimate comprises:
obtaining a pose estimate for the camera; and
generating a semi-dense depth estimate, the semi-dense depth estimate comprising depth estimates for a portion of the pixels in the image data,
wherein generating the second depth estimate comprises generating a dense depth estimate for the pixels in the image data, and
wherein probabilistically fusing the first depth estimate and the second depth estimate comprises outputting a dense depth estimate for the pixels in the image data.

14. The method of claim 9,
wherein the method is iteratively repeated and, for a subsequent iteration:
the method comprises determining whether to generate the second depth estimate, and
probabilistically fusing the first depth estimate and the second depth estimate comprises, responsive to a determination not to generate the second depth estimate, using a previous set of values for the second depth estimate.

15. The method of claim 9, wherein the method is applied to frames of video data and probabilistically fusing the first depth estimate and the second depth estimate comprises, for a given frame of video data:
optimising a cost function comprising a first cost term associated with the first depth estimate and a second cost term associated with the second depth estimate,
wherein the first cost term comprises a function of fused depth estimate values, first depth estimate values and uncertainty values for the first depth estimate,
wherein the second cost term comprises a function of fused depth estimate values, second depth estimate values, and uncertainty values for the second depth estimate, and
wherein the cost function is optimised to determine the fused depth estimate values.

16. The method of claim 15, wherein optimising the cost function comprises determining a scale factor for the fused depth estimate, the scale factor indicating a scale for the fused depth estimate with respect to the scene.

17. The method of claim 15, generating at least one surface orientation estimate for the scene using the neural network architecture, wherein the neural network architecture is configured to output a measure of uncertainty for each of the at least one surface orientation estimate,
wherein the cost function comprises a third cost term associated with the at least one surface orientation estimate,
wherein the third cost term comprises a function of fused depth estimate values, surface orientation estimate values, and uncertainty values for each of the at least one surface orientation estimate.

18. The method of claim 9, wherein the geometric reconstruction of the scene is configured to generate a first depth probability volume for the scene, the first depth probability volume comprising:
a first plurality of depth estimates, comprising the first depth estimate; and
a first plurality of measures of uncertainty, each associated with a respective depth estimate of the first plurality of depth estimates, wherein a measure of uncertainty associated with a given depth estimate of the first plurality of depth estimates represents a probability that a given region of the scene is at a depth represented by the given depth estimate of the first plurality of depth estimates; and
the neural network architecture is configured to output a second depth probability volume for the scene, the second depth probability volume comprising:
a second plurality of depth estimates, comprising the second depth estimate; and
a second plurality of measures of uncertainty, each associated with a respective depth estimate of the second plurality of depth estimates, wherein a measure of uncertainty associated with a given depth estimate of the second plurality of depth estimates represents a probability that a given region of the scene is at a depth represented by the given depth estimate of the second plurality of depth estimates.

19. The method of claim 18, wherein generating the second depth estimate for the scene comprises processing image data representative of an image of the scene using the neural network architecture to generate the second depth probability volume,
wherein the second plurality of depth estimates comprises a plurality of sets of depth estimates, each associated with a different respective portion of the image of the scene.

20. The method of claim 18, wherein the second plurality of depth estimates comprises depth estimates having predefined values.

21. The method of claim 20, wherein the predefined values have a non-uniform spacing therebetween.

22. The method of claim 20, wherein the predefined values comprise a plurality of log-depth values within a predefined depth range.

23. The method of claim 18, wherein generating the first depth probability volume for the scene comprises:
processing a first frame of video data representing a first observation of the scene and a second frame of video data representing a second observation of the scene to generate, for each of a plurality of portions of the first frame, a set of photometric errors, each associated with a different respective depth estimate of the first plurality of depth estimates; and
scaling the photometric errors to convert the photometric errors to respective probability values.

24. The method of claim 18, wherein probabilistically fusing the first depth estimate and the second depth estimate using the measures of uncertainty comprises combining the first plurality of measures of uncertainty with the second plurality of measures of uncertainty to generate a fused probability volume.

25. The method of claim 24, wherein generating the fused depth estimate for the scene comprises obtaining the fused depth estimate for the scene from the fused probability volume.

26. The method of claim 24, comprising:
obtaining a depth probability function using the fused probability volume; and
using the depth probability function to obtain the fused depth estimate.

27. The method of claim 24, wherein obtaining the fused depth estimate comprises optimising a cost function comprising:
a first cost term obtained using the fused probability volume; and
a second cost term comprising a local geometric constraint on depth values.

28. The method of claim 27, comprising:
receiving a surface orientation estimate and an occlusion boundary estimate from a further neural network architecture; and
generating the second cost term using the surface orientation estimate and the occlusion boundary estimate.

29. The method of claim 24, wherein the fused depth probability volume is a first fused depth probability volume associated with a first frame of video data representing a first observation of the scene, and the method comprises:
converting the first fused depth probability volume to a first occupancy probability volume;
warping the first occupancy probability volume based on pose data representing poses of a camera during observation of the scene to obtain a second occupancy probability volume associated with a second frame of video data representing a second observation of the scene; and
converting the second occupancy probability volume to a second fused depth probability volume associated with the second frame.

30. A computing system comprising:
a monocular capture device to provide frames of video;
a simultaneous localisation and mapping system to provide pose data for the monocular capture device;
the system of claim 1;
a semi-dense multi-view stereo component to receive the pose data and the frames of video and to implement the geometric reconstruction engine; and
electronic circuitry to implement the neural network architecture.

31. A robotic device comprising:
the computing system of claim 30;
one or more actuators to enable the robotic device to interact with a surrounding three-dimensional environment, wherein at least a portion of the surrounding three-dimensional environment is shown in the scene; and
an interaction engine comprising at least one processor to control the one or more actuators,
wherein the interaction engine is to use the fused depth estimate to interact with the surrounding three-dimensional environment.

32. A non-transitory computer-readable storage medium comprising computer-executable instructions which, when executed by a processor, cause a computing device to perform the method of claim 9.

* * * * *